United States Patent [19]

Funches et al.

[11] Patent Number: 5,305,160
[45] Date of Patent: Apr. 19, 1994

[54] COMPENSATING FOR VARIATIONS IN TORQUE CAPABILITY OF VOICE COIL MOTORS

[75] Inventors: Otis L. Funches, Oklahoma City; Randall D. Hampshire, Edmond; Vladimir Kovner, Oklahoma City, all of Okla.

[73] Assignee: Seagate Technology, Inc., Scotts Valley, Calif.

[21] Appl. No.: 738,793

[22] Filed: Jul. 31, 1991

[51] Int. Cl.$^5$ .............................................. G11B 5/596
[52] U.S. Cl. ............................... 360/78.07; 360/77.04; 360/78.06; 369/32
[58] Field of Search .................... 360/27, 77.05, 77.08, 360/77.11, 75, 77.01, 77.02, 77.04, 78.08, 78.06, 78.07, 78.14; 369/32, 34, 54

[56] References Cited

U.S. PATENT DOCUMENTS

| | | | |
|---|---|---|---|
| 4,217,612 | 8/1980 | Matla et al. | 360/78 |
| 4,314,291 | 2/1982 | Oda et al. | 360/78 |
| 4,333,117 | 6/1982 | Johnson | 360/78 |
| 4,591,933 | 5/1986 | Quackenbush | 360/78 |
| 4,594,622 | 6/1986 | Wallis | 360/77 |
| 4,864,437 | 9/1989 | Couse et al. | 360/75 |
| 4,899,234 | 2/1990 | Genheimer | 360/78.06 |
| 4,907,107 | 3/1990 | Sakurai | 360/77.04 |
| 4,907,109 | 3/1990 | Senio | 360/78.04 |
| 4,979,059 | 12/1990 | Sengoku | 360/78.09 |
| 5,003,415 | 3/1991 | Freeze | 360/78.06 |
| 5,128,812 | 7/1992 | Uno | 360/78.06 |
| 5,150,266 | 9/1992 | Albert | 360/78.04 |
| 5,208,711 | 5/1993 | Kitamura et al. | 360/78.04 |
| 5,216,647 | 6/1993 | Kitani | 360/78.06 |
| 5,227,930 | 7/1993 | Thanos et al. | 360/78.04 |
| 5,233,486 | 8/1993 | Albert | 360/77.04 |

Primary Examiner—William L. Sikes
Assistant Examiner—Terry D. Cunningham
Attorney, Agent, or Firm—Edward P. Heller, III; Bill D. McCarthy; Louis W. Watson

[57] ABSTRACT

A method for compensating for position and component induced variations in the acceleration and deceleration capabilities of a voice coil actuator in a disc drive, comprising the steps of dividing the discs radially into a plurality of zones, testing the acceleration and deceleration capability of the disc drive in each zone by performing specially controlled seeks in both inward and outward directions in each zone, comparing the result of these specially controlled seeks with a calculated nominal or desired result, and calculating a compensation factor for each zone which is applied by the servo system to all subsequent seek and track following operations.

2 Claims, 15 Drawing Sheets

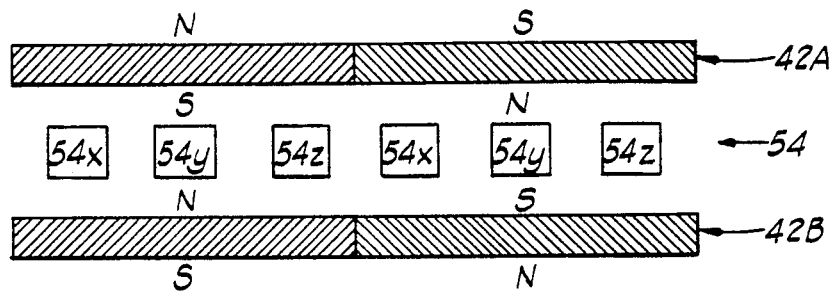
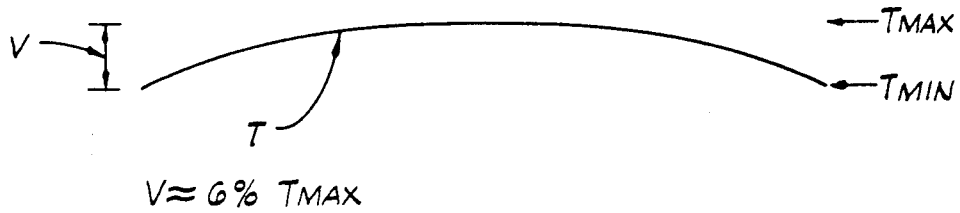
$V \approx 6\% \, T_{MAX}$
PRIOR ART
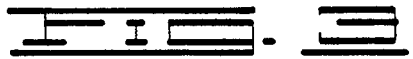
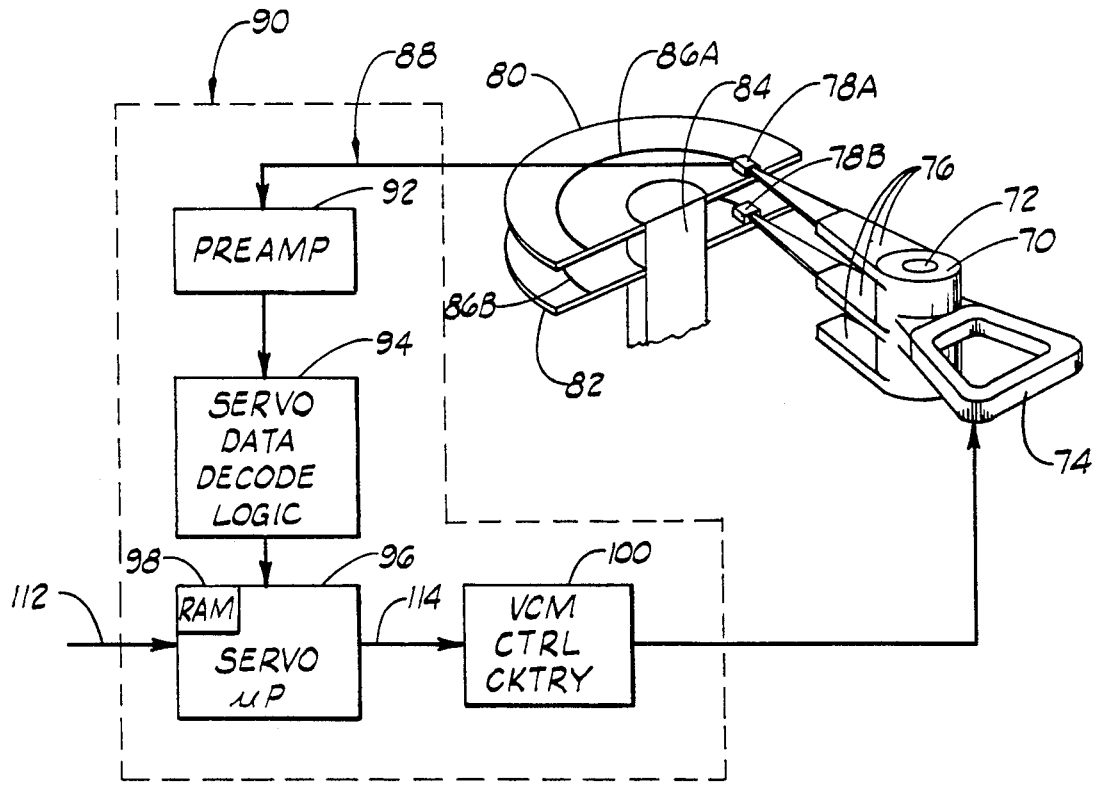
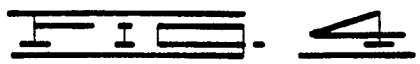

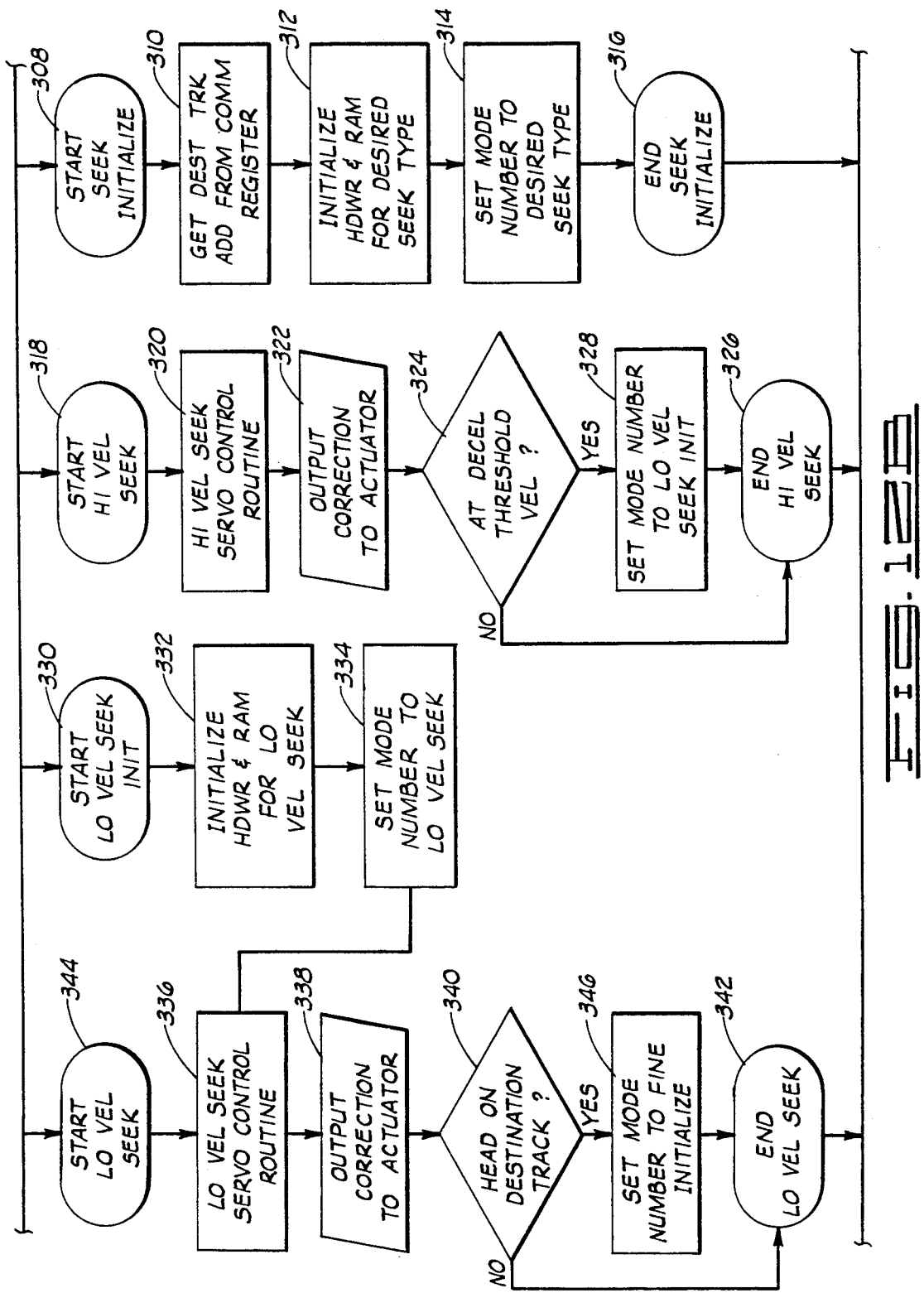

COMPENSATING FOR VARIATIONS IN TORQUE CAPABILITY OF VOICE COIL MOTORS

BACKGROUND OF THE INVENTION

1. Field of the invention

This application is directed to the field of disc drive data storage devices and more particularly, but not by way of limitation, to a method for compensating for variations in the torque constant of a voice coil driven actuator for moving the read/write heads in a hard disc drive data storage device.

2. Brief Description of the Prior Art

Disc drives of the type referred to as "Winchester" disc drives are well known in the industry. Such disc drives incorporate a "stack" of one or more disc-shaped platters mounted on a spindle motor for constant high speed rotation. The surface of these discs is coated with a magnetizable medium for the recording of digital data in a plurality of circular, concentric data tracks.

A number of read/write heads act in cooperation with the disc surfaces for the recording and retrieval of data. These heads are attached to some sort of actuator mechanism which operates under the control of electronic circuitry to controllably move the heads from track to track.

The actuator that moves the read/write heads has taken many different forms over the years. Early Winchester disc drives for personal computers used a stepper motor to move the read/write heads in an "open loop" control scheme. This open loop control relied on the magnetic detent inherent in stepper motor construction to define the location of each data track on the disc surface. That is, once a starting track location, commonly referred to as "track zero", was located (typically closely adjacent to the outer diameter of the discs), all other tracks were located by keeping a record of the "current track" number and applying a calculated number of step pulses to the stepper motor to move the read/write heads inward or outward to the desired track location. In such an open loop control scheme, there was no "feedback" from the disc surface to ensure the repeatable accuracy of the relative location of the heads to the data tracks, thus limiting the density of the spacing between tracks to the accuracy of the stepper motor itself, which in turn was limited by the precision of the machining of the internal components of the motor. The speed of such an actuator, while improved with manufacturing and control techniques, was also quite limited.

Over the years, the market has demanded disc drives of greater capacity and faster access capability than could be achieved using stepper motors to drive the actuator. This lead to the increasing prevalence of the use of voice coil motors to drive the actuator. Early linear voice coil motors, which drove the read/write heads on a straight radial line across the disc surface, have currently been largely superceded by rotary voice coil actuators, because of their compact size and reduced moving mass, thus permitting smaller disc drive packages with faster access speeds.

A typical rotary voice coil actuator, also sometimes referred to as a voice coil motor or VCM, consists of an arrangement of permanent magnets fixed relative to the housing of the disc drive, and a coil (or coils) mounted on the movable portion of the actuator within the magnetic field of the permanent magnets. When controlled DC current is applied to the coil, a magnetic field is generated surrounding the coil which interacts with the magnetic field of the permanent magnets to force movement of the coil and actuator body on which the coil is mounted. The amount of force generated by this magnetic interaction (and thus the torque capability of the motor) is dependent on many factors, including the strength of the permanent magnets; the size and number of turns in the coil; the amount of current applied to the coil; and the proximity of the coil to the magnets. Advances in materials science, manufacturing technology and electronic controls have lead to the current generation of disc drives which use rotary voice coil actuators to provide capacities of several hundred megabytes with average access times of less than fifteen milliseconds, all in the five and one-quarter inch or smaller form factor disc.

A voice coil motor does not have inherent magnetic detent, so another technique must be used to control the movement of the read/write heads from one data track to another. This usually involves the use of a "closed loop servo" system. In a closed loop servo system, head position information is recorded on either a dedicated servo surface of one of the discs, or on specific dedicated portions of the disc surfaces used to store user data. In the case of a dedicated servo surface, a servo head constantly reads prerecorded positional information and sends this information to the electronic circuitry used to supply drive current to the motor coil as "feedback". The VCM control circuitry uses this feedback to stay centered on, or follow, a desired track, and to control "seeks" from one track to another. For disc drives using an "embedded servo", prerecorded positional information is placed on the same disc surfaces used to record user data and is read back to the actuator motor control logic only during carefully timed "windows", during which time all data reading and writing capability is disabled. Hybrid systems using both a dedicated servo surface and embedded servo information have also been used, although the penalty in lost data recording space has made this type of system rare.

One of the primary goals of all high volume manufacturers of disc drives is to produce products that are highly consistent from unit to unit without imposing such strict component control that the cost of the unit becomes prohibitive in the marketplace. Similarly, these manufacturers must make disc drives which perform uniformly over a wide range of ambient temperatures, e.g., from about 5°-50° C. (41°-122° F.), with internal temperatures exceeding these ambient temperatures by up to 20° C.. These demands and goals lead to one of the more difficult challenges facing disc drive manufacturers.

A high volume disc drive manufacturer can expect to build several hundred thousand, or even several million, of the same disc drives over the life of the product. It is therefore impossible, without economically prohibitive controls, to produce perfectly uniform magnets for use in these products, and magnet strength, of necessity, can therefore be expected to vary from unit to unit by as much as +10%. Similarly, the magnetic strength within a given magnet is not absolutely uniform and will therefore cause the strength of magnetic interaction between the permanent magnets and the magnetic field of the moving coil of a voice coil actuator to vary dependent upon the relative position of the coil to the magnets. Also, the strength of the magnets can be expected to decrease over the operational life of the disc drive and to vary across the specified operational temperature range as well. Furthermore, tolerance variations allowed in the electronic components supplying the drive current to the coil in a voice coil motor create yet another variable which impacts the motive force of the motor. Other mechanical variables in the actuator mechanism of the disc drive, such as the precision of the ball bearings used to guide the motion of the actuator, make it extremely difficult to produce large numbers of very uniform disc drives.

It is therefore desirable that a way be found to compensate for normal expected variations in the magnetic and electronic components in a voice coil actuator for a disc drive.

SUMMARY OF THE INVENTION

The present invention provides a technique which includes the steps of radially dividing the disc surfaces into a number of zones, testing the torque constant of the voice coil motor in each zone with the motor moving in both directions, calculating and storing a compensation factor for each zone, and retrieving and applying the appropriate compensation factor to the motor control circuitry dependent upon the zone in which the read/write heads are located during both seeks to a desired track and normal track following.

The testing of the torque constant in each zone may be accomplished as part of the "power on" routine, or may be done periodically at given time intervals, or may be initiated based on sensed changes in the operating characteristics of the disc drive unit.

It is an object of the present invention to compensate for normal component variation in the magnetic and electronic components that make up a voice coil motor and control circuitry of disc drives.

It is another object of the present invention to compensate for normal component variation in the magnetic and electronic components that make up a voice coil motor and control circuitry of a disc drive to eliminate the effects dependent on the relative position of the coil to the magnets in the voice coil motor.

It is another object of the present invention to compensate for normal variation in the magnetic components of a voice coil motor due to changes in temperature over a specified temperature range.

It is yet another object of the invention to compensate for expected variations in the magnetic components of a voice coil motor and its electronic control circuitry over the service life of a disc drive.

Other objects, features and advantages of the present invention will become apparent from the following detailed description when read in conjunction with the drawings and appended claims.

BRIEF DESCRIPTION OF THE DRAWINGS

The features and advantages of the present invention may best be understood by reference to the accompanying drawings, wherein:

FIG. 4 is a simplified functional block diagram of a servo system with which the present invention is particularly useful.

FIGS. 9A, 9B, 9C and 9D depict oscilloscope signals comparing the performance of a typical drive (FIGS. 9A and 9B) to the same drive incorporating the present invention (FIGS. 9C and 9D).

FIGS. 12A-12C are flow charts of the top level interrupt service routine executed by the servo microprocessor of FIG. 4.

DETAILED DESCRIPTION

Figure 1:
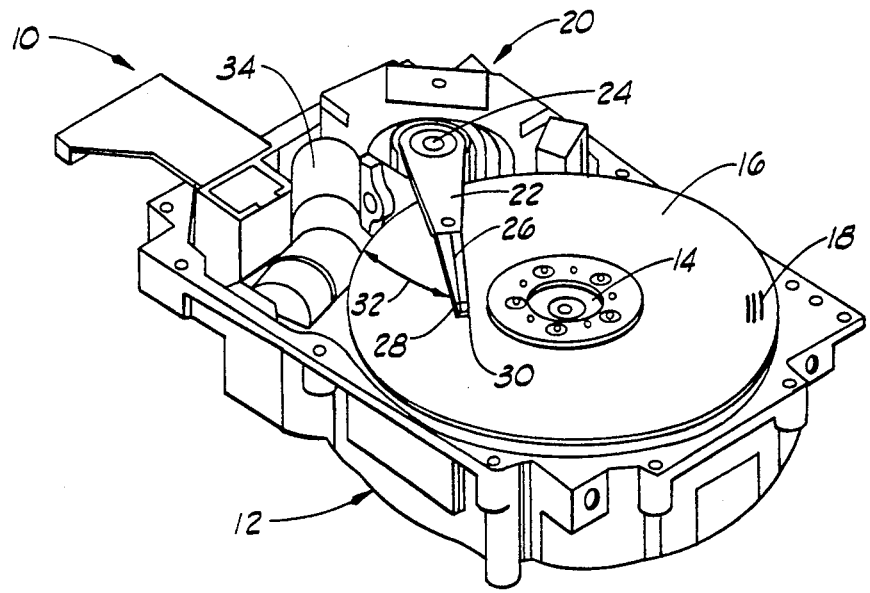
FIG. 1 is a perspective drawing of a prior art disc drive of the type for which the present invention is particularly useful.

Referring to the drawings and specifically to FIG. 1, shown is a disc drive 10, with the top cover (not shown) removed, in which the present invention is particularly useful. The disc drive 10 includes a base casting 12, sometimes referred to as a base member, to which other mechanical components are mounted. A spindle motor 14 is mounted to the base casting 12 and supports a plurality of discs 16 for rotation. The surfaces of the discs 16 include a multiplicity of tracks 18. An actuator motor, shown generally at 20, serves to rotate an actuator body 22 about a pivot shaft 24 under control of electronic circuitry (not shown). The actuator body 22 includes a number of head mounting arms 26 which in turn mount a number of head supports 28, each mounting a head 30. As the actuator body 22 is rotated about the pivot shaft 24, the heads 30 are moved across the discs 16 along an arcuate path 32 to provide access to the tracks 18. The actuator motor 20 is the type referred to as a rotary voice coil actuator, and drive current to control the movement of the coil (not shown) and consequently the actuator body 22 and heads 30 is brought to the coil via a printed circuit cable (PCC) 34, which also forms the signal path for write signals to the heads 30 and read signals from the heads 30. For purposes of the ensuing discussion, it will be assumed that the top surface of the top disc is a servo surface and that the top head is a servo head, with all other disc surfaces and heads devoted to the storage of user data.

Figure 2:
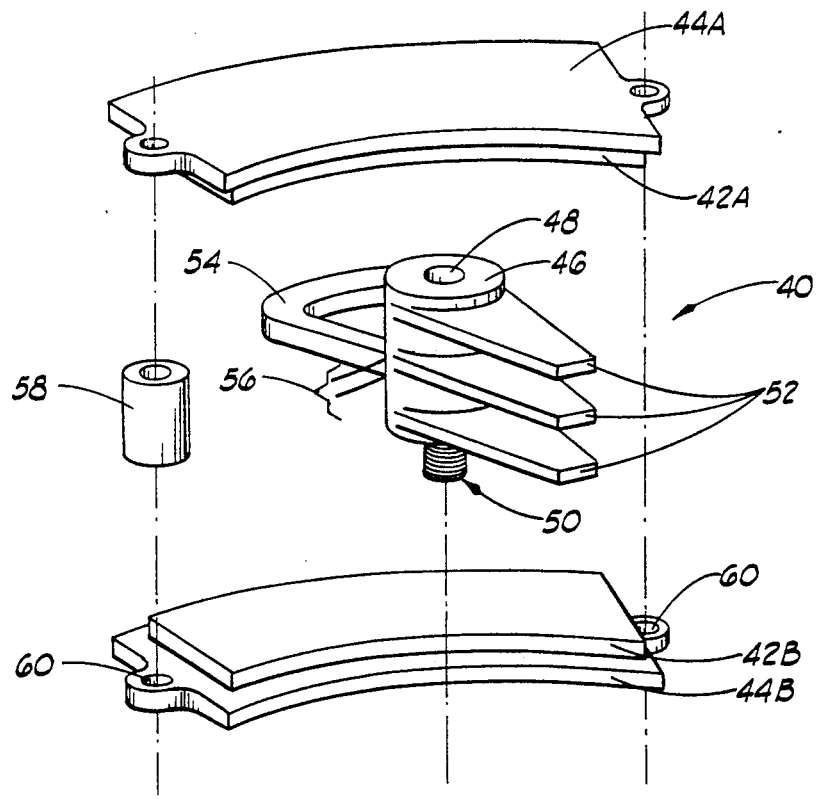
FIG. 2 is an exploded perspective view of the major components of a typical prior art rotary voice coil actuator.

FIG. 2 is an exploded perspective view of a voice coil actuator 40, such as that shown in FIG. 1. An upper permanent magnet 42A and a lower permanent magnet 42B are fixedly mounted to an upper backing plate 44A and a lower backing plate 44B, respectively. An actuator body 46 is mounted to a pivot shaft 48 using a system of ball bearings (not shown) so that the actuator body 46 is pivotable about the pivot shaft 48. The pivot shaft 48 itself includes a threaded end 50 for attaching the pivot shaft 48 to the base casting 12. Alternatively, the pivot shaft 48 could include a tapped hole (not shown) in its lower end to receive a screw (also not shown) for attaching the pivot shaft to the base casting.

The actuator body 46 includes a number of head mounting arms 52 which may be an integral part of the actuator body 46 or separately fabricated and fastened thereto. Also fixedly attached to the actuator body 46 is a coil 54, two ends 56 of which are connected via a PCC 34 to electronic circuitry (not shown). When the actuator 40 is assembled into the disc drive 10, the lower backing plate 44B is brought to rest on the base casting 12, and the pivot shaft 48 is fixed to the base casting 12 with the coil 54 overhanging the lower magnet 42B. An arrangement of spacers 58 (one shown) is then placed atop mounting holes 60 in the lower backing plate 44B and the upper mounting plate/upper magnet assembly 44A/42A is placed atop the spacers 58 and the assembly completed by attaching the backing plates 42A, 42B and spacers 58 to the base casting 12 using screws (not shown) through the mounting holes 60.

When the actuator 40 is thus assembled, the coil 54 is disposed between the upper and lower magnets 42A, 42B with a narrow air gap (not designated) separating the surfaces of the magnets 44A, 44B from the coil 54. When DC current is applied to the ends 56 of the coil 54, a resulting magnetic field (not shown) is created about the coil 54 and this magnetic field interacts with the magnetic field of the permanent magnets 42A, 42B to cause the actuator body 46 to rotate about the pivot shaft 48, moving the heads 30 of FIG. 1 across the discs 16. The backing plates 44A, 44B and spacers 58 form the mechanical support structure for the permanent magnets 42A, 42B, and are formed from steel or other magnetically permeable material to form a secondary flux path for the magnets 42A, 42B.

Various modifications to the basic components shown have been employed in the art. For instance, the backing plates 44A, 44B can be appropriately configured in the areas of the mounting holes 60 to eliminate the need for the spacers 58, or the permanent magnets 42A, 42B can be replaced by discrete magnet portions without changing the basic operating principles controlling the operation of the actuator motor 40.

A person of skill in the art will recognize that FIG. 2 also shows that the strength of the permanent magnet field in the region of the coil 54, and thus the torque capability of the motor, is controlled at least in part by the height of the spacers 58, and that differences in the height of the spacers 58 will result in non-parallelism between the magnets 42A, 42B and cause a difference in the torque of the motor 40 as the coil 54 moves in relationship to the permanent magnets 42A, 42B. Similarly, variations in the magnetic material and in the process used to magnetize the magnets 42A, 42B result in changes in the intensity of the magnetic field of the magnets 42A, 42B as the actuator body 46 rotates about the pivot shaft 48 and changes the position of the coil 54 relative to the magnets 42A, 42B.

Yet another position-dependent variable is depicted in FIG. 3, which is a simplified cross-sectional view of the permanent magnets 42A, 42B and the coil 54. In FIG. 3, the polarization of the permanent magnets 42A, 42B is represented by the diagonal crosshatching. On the left side of the figure, the magnets 42A, 42B are crosshatched lower left to upper right, indicating a north-south polarity from top to bottom, while on the right side of the figure, the crosshatching runs from upper left to lower right, indicating a south-north polarity from top to bottom. Cross sections of the radially extending side arms of the coil 54 are depicted with the coil 54 in three different positions. Sections labeled 54X represent the two arms of the coil 54 when the coil 54 has moved to its leftmost position relative to the magnets 42A, 42B, while the sections labeled 54Y and 54Z show the coil centered on the magnets 42A, 42B and in its rightmost position relative to the magnets 42A, 42B, respectively.

FIG. 3 illustrates that when the coil 54 is centered on the magnets 42A, 42B, the coil sections 54X lie in the center of the magnetic fields generated by the magnets 42A, 42B. However, when the coil 54 moves to the left, as shown by coil sections 54X, or to the right, as shown by coil sections 54Z, the coil 54 approaches the edge of the magnetic field, thus reducing the torque capability of the motor 40 as the heads (not shown) on the opposite side of the actuator body 46 move toward the innermost and outermost tracks, while the magnetic strength of the interaction between the coil 54 and the magnets 42A, 42B is greatest as the heads approach the center of their range of motion. This tendency is shown by the torque curve T at the bottom of FIG. 3. As the curve T shows (without considering the effects of localized variations in the magnetic strength of the magnets 42A, 42B), the variation (V) between the minimum torque ($T_{min}$) at the ends of the range of motion of the actuator motor 40 and the maximum torque ($T_{max}$) at the center of the range of motion of the actuator motor 40 can be as much as 6% of the maximum torque ($T_{max}$). This positional variance (V) in the torque capability can degrade the performance of the disc drive unless the variance (V) can be cancelled out by compensation.

It is also known that the strength of the magnetic field of permanent magnets varies significantly with temperature, and since disc drives are specified to operate over a fairly large temperature range, the magnetic interaction of the permanent magnets 42A, 42B and the coil 54 can be expected to vary by as much as +5%, i.e., becoming lower as temperatures rise and increasing as temperatures go lower. While this normal cycling of operating temperature over the specified range may not significantly impact the operation of the disc drive, such heating and cooling of the magnetic components over the operational life of the disc drive does cause the "permanent" magnets to decrease in strength over time. This should not be allowed to adversely affect the operation of a disc drive over its intended usage life.

The power supply used to supply the D/A converter in the VCM control circuitry can also vary by about +3%. This variation can cause degraded performance of the disc drive actuator if not compensated for in the disc drive design.

Yet another possible variation in the operation of the actuator 40 can be caused by the technique used to prerecord the servo information on the servo disc. This "servo writing" is typically accomplished using some actuator mechanism other than the disc drive actuator motor to move the servo head. For instance, the assembly disc drive is placed in a fixture and a servo actuator is mechanically attached to the disc drive actuator. No power is applied to the disc drive actuator motor. In the case of a rotary VCM actuator such as described above, the heads move in an arcuate path which is not a perfect radius of the disc. Many servo writers employ a linear motor to move the heads during servo writing. Even if the servo writer actuator moves along the radius of disc the servo track will be written more closely at the outer and inner area of the discs than in the center of data area. When the rotary disc drive actuator later attempts to follow the servo tracks for seeking and track following operations this variation in radial track density can result in different torque requirements for moving the same number of tracks dependent upon the location of the track seek.

One aspect affecting the operation of the voice coil motor 40 that has not been discussed in detail up to this point is the electronic circuitry used to provide drive current to the coil 54. While a more detailed discussion of the servo system will follow, it is still pertinent at this time to note that normal component tolerances for electronic components can cause the current applied to the coil 54 to vary significantly from unit to unit, thus impacting the uniformity of the final product. It should also be noted that the normal heating and cooling of these electronic components during the service life of the disc drive can also lead to aging of these components and changes in the performance of the disc drive.

It is equally apparent that, if left uncompensated, all of these inconsistencies can result in unacceptable variation in the operation of the voice coil actuator, both from unit to unit, as well as within an individual unit with temperature and over time.

FIG. 4 is a simplified block diagram of a servo system in which the present invention is particularly useful. Shown in FIG. 4 is an actuator body 70 which pivots about a pivot shaft 72 when drive current is applied to a coil 74 which lies between a pair of permanent magnets (not shown) as was discussed in relationship to FIG. 2 above. On the opposite side of the actuator body 70 from the coil 74 is a plurality of head mounting arms 76 which in turn support a number of heads, two of which have been shown as 78A and 78B. The heads 78A, 78B are arrayed to cooperate with a stack of discs 80, 82 mounted for rotation on a spindle motor 84. While, in actual disc drives, there could be a larger number of discs, and a head associated with each disc surface, for purposes of clarity, only two discs 80, 82 and two heads 78A, 78B are shown.

For this and the following discussion, it will be assumed that the top head 78A is a "servo head", and that the top surface of the top disc 80 (hereinafter referred to as a "servo disc"), contains prerecorded positional information. All other heads and discs will be referred to as "data heads" or "read/write heads", and "data discs", respectively. The basic principle of operation of the servo system is that, if the servo head 78A can be made to seek to and follow a given servo track 86A on the servo disc 80, all data heads 78B will simultaneously seek to and follow corresponding data tracks 86B. To facilitate this seeking and track following, servo data 88 read from the servo disc 80 is directed into a "servo loop" 90 which consists of a preamplifier 92, servo data decode logic 94 which includes an analog-to-digital (A/D) converter (not shown separately), a servo microprocessor 96 with associated RAM 98 and a VCM control circuitry 100, which includes a power amp and a digital-to-analog (D/A) converter (both not shown separately). A detailed description of the servo loop 90 can be found in co-pending U.S. patent application Ser. No. 07/738,053, entitled HARD DISC DRIVE WITH IMPROVED SERVO SYSTEM, filed concurrently herewith, and assigned to the assignee of the present invention and incorporated herein by reference. Before continuing with the discussion, it is perhaps better at this time to describe the format of the servo information prerecorded on the servo disc 80.

Figure 5:
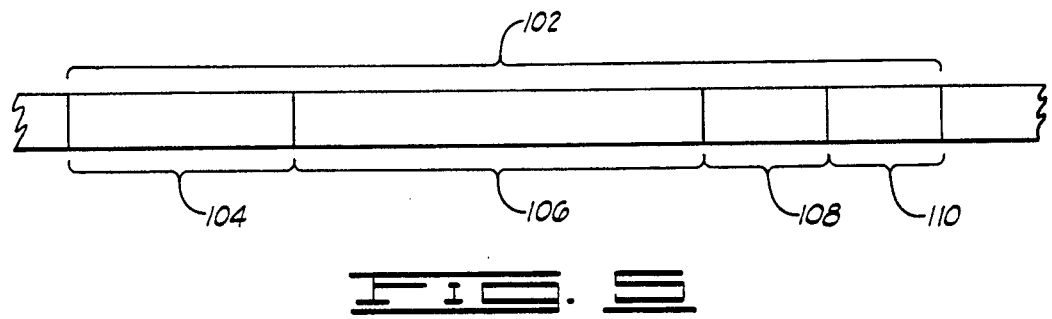
FIG. 5 is a diagrammatic representation of a single frame of servo information for the servo system of FIG. 4.

The servo information on the servo disc 80 is recorded at the time of manufacture using a highly precise servo writer. Servo tracks correspond to the locations of data tracks on the other disc surfaces. Each servo track is divided circumferentially into a fixed number of "frames", and the format of one servo frame is depicted in FIG. 5. As shown in FIG. 5, each frame 102 is further divided into four separate fields, specifically an address field 104, a position field 106, a sector field 108, and a sync field 110. The function of the address field 104 is to provide a track address; that is, to define the approximate radial position of the head when the address field 104 is read. The position field 106 is used to define the exact radial position of the servo head relative to the servo track. The sector field 108 is encoded with information defining the circumferential position of the disc relative to the head and the sync field 110 is used to aid in the development of timing signals. Each frame 102 requires approximately 420 nanoseconds to pass below the servo head and there are 400 of these frames 102 per track if the discs 80, 82 are rotating at 3600 RPM, or 300 frames if the discs 80, 82 are rotating at 4800 RPM. Furthermore, the final sync field 110 of the final frame 102 contains special coding to define the "beginning" of each track and allow the generation of an "index" signal.

Referring now to both FIGS. 4 and 5, the servo microprocessor 96 runs a simple loop program waiting for the servo data decode logic 94 to generate the index signal. At specifically timed intervals during the time the servo frame 102 passes under the servo head 78A, an interrupt is sent to the servo microprocessor 96, and the information in the servo frame 102 is read by the servo microprocessor 96, thus keeping the servo microprocessor 96 constantly "aware" of the radial and circumferential position of the servo head 78A and, therefore, the data heads 78B as well. The use that the servo microprocessor 96 makes of this information depends on the operational mode of the disc drive at the time of the interrupt. That is, if the disc drive is the track following mode, the servo loop 90 simply decodes the information in the servo frame 102 to maintain the servo head 78A centered on the current track. If, however, the servo microprocessor 96 has received a command to seek from the current track to another track on command path 112, the servo microprocessor 96 sends a digital value on signal path 114 which causes the VCM control circuitry 100 to apply a controlled DC voltage of the proper polarity to begin moving the actuator in a controlled manner to the desired track. The specifics of track following and seeking are described in more detail in U.S. Ser. No. 738,053, incorporated herein by reference.

Figure 6:
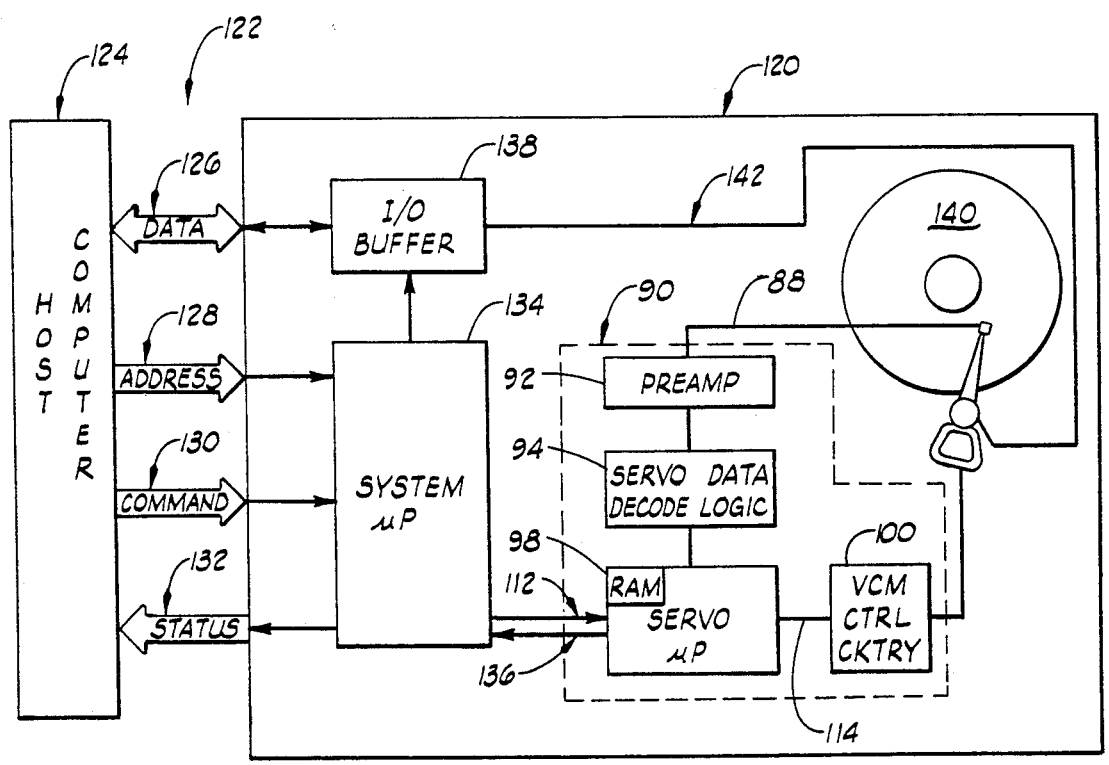
FIG. 6 is a simplified block diagram of a disc drive and its connection to the host computer system including the servo system of FIG. 4.

An overall system block diagram is shown in FIG. 6, with the servo loop 90 of FIG. 4 included within a disc drive 120. A host interface 122 connects the disc drive 120 to a host computer system 124. The host interface 122 includes a bi-directional data bus 126, an address bus 128 for passing "logical block addresses" (LBAs) from the host computer system 124 to the disc drive 120, a command bus 130, and a status bus 132. The disc drive 120 also contains a system microprocessor 134 the primary function of which is to receive, decode and execute commands from the host computer system 124. These commands are carried to the disc drive 120 via the command bus 130. A typical interface of this type is referred to as a SCSI (Small Computer Systems Interface) Bus, and the commands convey instructions to the disc drive for such actions as the storing and retrieval of data.

The SCSI Bus commands define the disc storage space in terms of LBAs. One of the functions of the system microprocessor 134 in the disc drive 120 is to convert these LBAs into a physical address on the disc. The physical address is defined by cylinder, head and sector. A cylinder is the radial position defined by a vertically aligned group of data tracks and a corresponding servo track. Selecting a head defines which of the data tracks in the cylinder will be accessed, and the sector defines the circumferential position on the track where the block of data to be transferred begins. Once the system microprocessor 134 has translated the LBA to a physical address, the seek to that address is initiated by a command passed to the servo microprocessor 96 on the command path 112 in FIG. 6. This command includes a physical address which the servo microprocessor 96 compares with the current position of the actuator derived from the servo data decode logic 94.

If the physical address requested by the system microprocessor 134 differs from the current cylinder, the servo microprocessor 96 initiates a seek to the desired cylinder, and reports the completion of the seek to the system microprocessor 134 via an inter-processor status bus 136. Once the seek is completed, the system microprocessor 134 then selects the direction for data transfer based on the command received via the host interface 122. That is, if data is to be written onto the disc, the data received over the data bus 126 is passed to a data buffer 138 and then serially written to a disc 140 via an internal data bus 142. Completion of the transfer is signified to the host computer system 124 via the status bus 132 in the host interface 122. Conversely, if data is to be retrieved from the disc 140, it is serially read from the disc 140 via the internal data bus 142 into the data buffer 138. Notification of the availability of the data in the data buffer is sent to the host computer system 124 via the status bus 132 and the data is then transferred to the host computer system via the data bus 126.

It is the general purpose of the present invention to "pre-test" the disc drive to determine the actual performance of the actuator in each of several radial zones and to store a set of compensation factors for each of these zones in the RAM 98. These compensation factors will then be retrieved by the servo microprocessor 96 dependent on the radial position detected in the servo loop 90 and used by the servo microprocessor 96 to "fine tune" the control signals passed to the VCM control circuitry 100 via the signal path 114 in order to control the current in the actuator coil and provide uniform operation of the actuator regardless of its position. That is, if the servo head is currently in a zone which the pre-testing determined to be "weak", the compensation factor for that zone will cause the VCM control circuitry 100 to apply a larger current to the coil, and conversely, if the servo head is in a zone pretested as "strong", the compensation factor for the zone will cause the VCM control circuitry 100 to apply a smaller current to the coil.

The actual testing, or calibration routine, is initiated by the system microprocessor 134. The calibration routine would typically be started as a part of a "power up routine" which is executed by the system microprocessor 134 whenever power is first applied to the disc drive 120. Other circumstances which may cause recalibration will be discussed below. The testing or calibration routine involves a series of seeks such as those discussed above.

Figure 7:
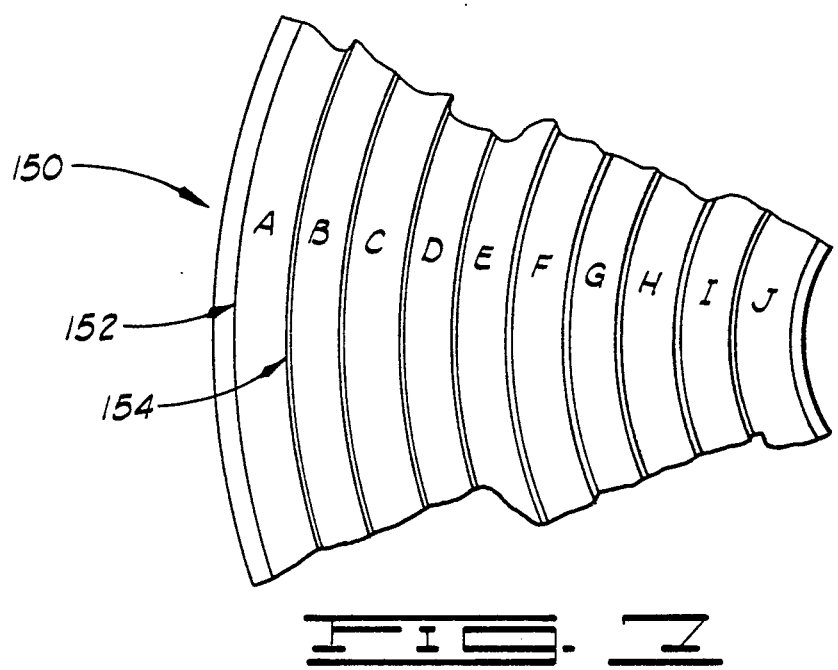
FIG. 7 is a simplified diagram illustrating the test method which is a portion of the present invention.

FIG. 7 illustrates the general concept of the calibration routine. Shown in FIG. 7 is a plan view of a segment of a stack of discs 150. The stack of discs 150 has been divided radially into a number of zones labeled A through J. The actual number of zones is dependent on a number of factors, such as the uniformity of the magnets in the actuator motor, the expected variation in the torque constant over positional changes in the coil of the actuator, etc. The calibration routine involves an inward seek and an outward seek in each zone, i.e., the heads are first moved to an outermost track 152 in zone A and a seek is initiated toward an innermost track 154 in zone A, followed by a seek from the innermost track 154 in zone A to the outermost track 152 in zone A, followed by similar seeks in each of the succeeding zones B through J. Calibration is accomplished by the manner in which these seeks are actually performed.

Each calibration seek is actually divided into two distinct steps:
1. the seek is started by the application of a fixed DC voltage to the actuator coil for a preselected period of time, and
2. the "normal" seek mode is entered and allowed to complete the seek by decelerating the heads to rest at the destination track.

The fixed DC voltage and preselected time period of step 1, above, are chosen such that an actuator and attached control electronics having nominal characteristics will move the heads a known number of tracks. At the end of the preselected time period, and while the normal seek mode is being entered to complete the seek, the track address is read and compared to the expected track number to determine the ratio of the actual performance to the nominal performance. After seeks in both directions have been so tested for the zone, an average performance ratio is calculated and a zone compensation factor is derived. This zone compensation factor is then stored in the RAM 98 (FIGS. 4 and 6) associated with the servo microprocessor 96. These stored zone compensation factors are used during subsequent seeks and during track following to assure specified performance of the actuator regardless of the position of the actuator and component variation.

For purposes of the ensuing discussion, it will be assumed that the discs 150 have been radially divided into ten zones, and that each zone contains 256 tracks, although the number of zones and the number of tracks in each zone may differ without violating the spirit of the present invention. Also, the fixed DC voltage and time period are selected to move the heads across half the tracks in a zone (128 tracks) if the actuator and drive components are operating at the nominal performance level.

To measure the variance from nominal of acceleration (or deceleration) capability in a 256 track zone:

1. Position the heads on the track of the outer zone boundary (the head should be at track center and near zero velocity);
2. Apply a constant current to the actuator coil by outputting a single value to the D/A convertor that forms a part of the VCM control circuitry 100 (FIGS. 4 and 6);
3. Wait the preselected time interval (in a zone with nominal acceleration capability, the heads will cross exactly 128 tracks in this time interval);
4. Record the track address the heads are passing over exactly at the end of the time interval;
5. Bring the heads to a stop at the track at the inner zone boundary by entering the normal seek mode (also referred to as the "velocity control mode") with a destination track that is 256 tracks from the outer zone boundary;
6. Calculate a coefficient $K_{in}$ by dividing 128 by the actual number of tracks crossed as recorded in step 4 above and store the coefficient $K_{in}$ temporarily;
7. Ensure that the heads are at the track of the inner zone boundary with near zero velocity;
8. Apply the same fixed DC voltage but with opposite polarity to the actuator coil for the same preselected time interval;
9. Read the track address the heads are passing over exactly at the end of the time interval, subtract this track number from the track number of the inner zone boundary and record the number of tracks crossed;
10. Bring the heads to a stop at the track at the outer zone boundary by entering the normal seek mode with a destination track that is 256 tracks outward from the inner zone boundary;
11. Calculate a coefficient $K_{out}$ by dividing 128 by the actual number of tracks crossed as recorded in step 9;
12. Add $K_{in}$ to $K_{out}$ and divide by 2 to obtain a bidirectional average $K_{avg}$ for this zone; and
13. Store the $K_{avg}$ in the RAM 98 (FIGS. 4 and 6) of the servo microprocessor 96.

Figure 8:
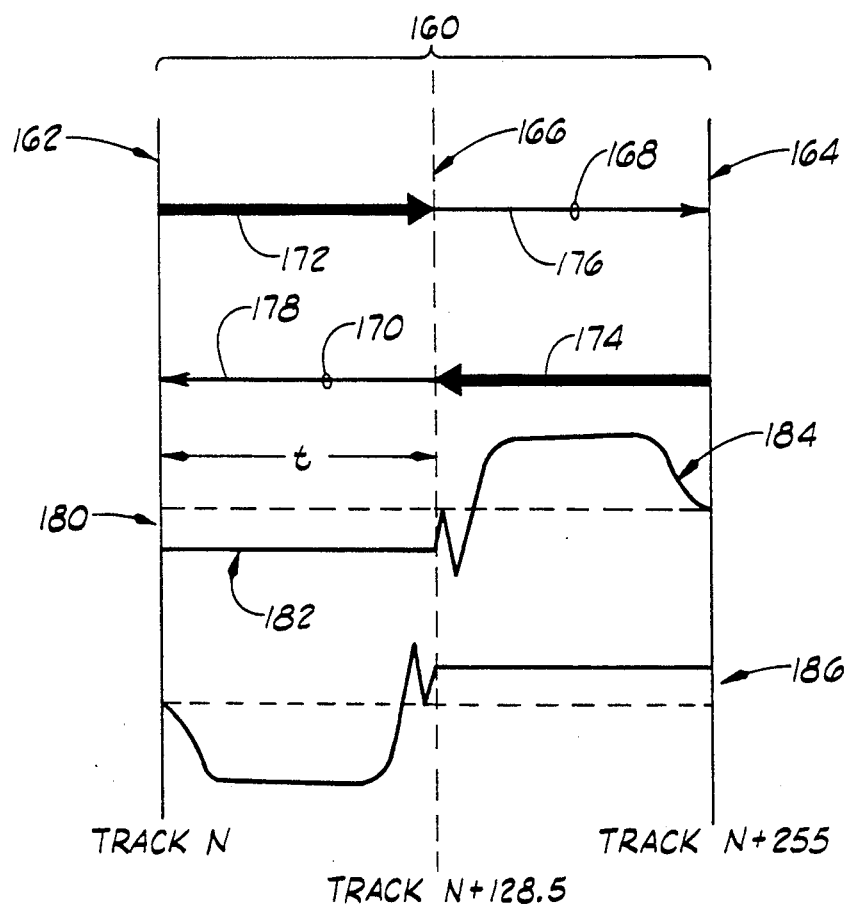
FIG. 8 is another diagram showing the test method of the present invention.
Figure 3A:
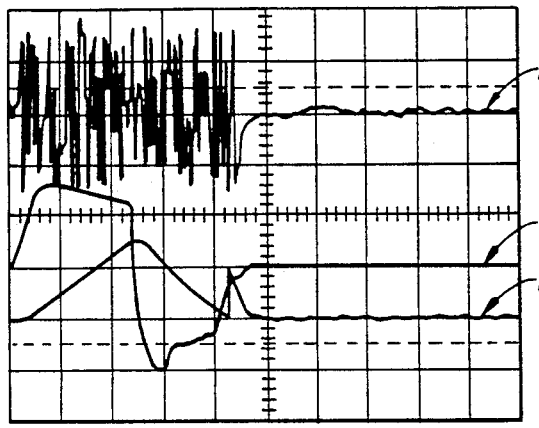
FIG. 3 is a sectional view of the major components of a typical prior art rotary voice coil actuator motor.
Figure 3C:
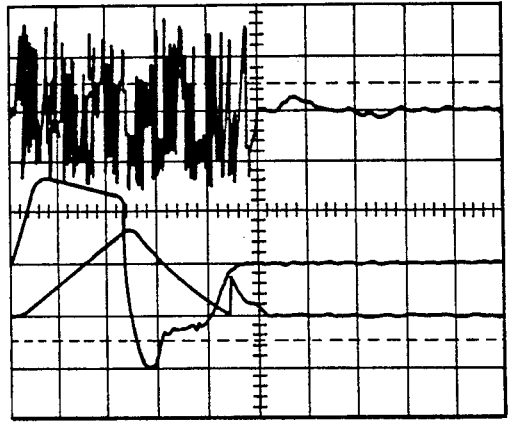
Figure 3B:
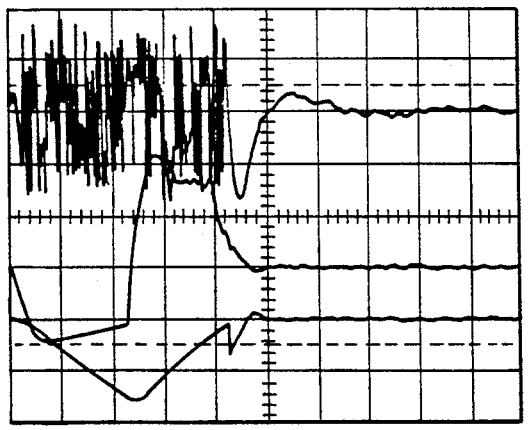
Figure 3D:
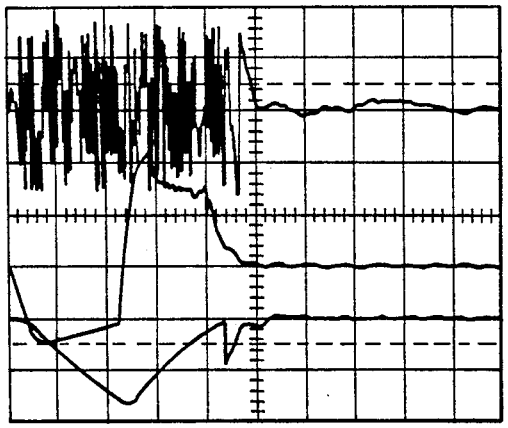

FIG. 8 is a graphic illustration of this calibration technique. In FIG. 8, a single zone 160 is depicted having an outer zone boundary 162 at track n, an inner zone boundary 164 at track n+255 and a zone center 166 at track n+128.5. Head movement is represented by two arrows 168 and 170. Each of the arrows 168, 170 has a heavy portion 172, 174, respectively, representing head movement during the application of the fixed DC voltage to the actuator coil, and a lighter portion 176, 178 indicating movement of the heads in the normal seek mode use to remove velocity from the heads and bring the heads to rest.

Directly below these arrows 168, 170 is a waveform 180 showing the output of the D/A convertor to the coil for the calibration seek represented by the top arrow 168. As shown, the D/A convertor applies a fixed DC voltage 182 for a time interval t calculated to move the head from track n to track n+128, and then a controlled pulse 184 of opposite polarity is output to the coil to bring the heads to rest at track n+255. A similar wave-form 186 shows the output of the D/A convertor for the second calibration seek represented by the second arrow 170. The time scale of the first waveform 180 runs from left to right, while the time scale of the second waveform 186 runs from right to left, and the polarity of the signals sent to the actuator is reversed with the reversal of the direction of movement.

The above thirteen steps would then be repeated for each of the remaining zones with the results stored in the RAM 98 of the servo microprocessor 96.

Once the table of zone coefficients ($K_{avg}$) has been generated, the velocity and gain control coefficients can be multiplied by the $K_{avg}$ for the zone to which the heads are moved. This will provide uniform control from the outer cylinder to the inner cylinder of the disc drive. With the gain thus adjusted to match the variations of acceleration (and deceleration) capability over the entire surface of the drive, the servo loop can have a higher gain because a variance in loop gain is minimized, allowing for design optimization without having to compensate for maximum gain variance. Not only does this technique compensate for variations over the surface of a particular drive, but for drive to drive variations as well.

The effectiveness of the calibration technique is shown by the oscilloscope displays depicted in FIGS. 9A through 9D. In these figures, the horizontal time scale is in increments of 2 milliseconds per division for all signals. FIG. 9A shows a servo position error (SPE) 190 (156 microinches per vertical division), actuator drive current 192 (0.89 Amps per vertical division) and seek velocity curve 194 for a seek from track zero to track 500 in a disc drive which had not been through the calibration procedure, while FIG. 9B shows the same signals for the same disc drive seeking from track 500 to track zero. The vertical scale of the velocity curve 194 requires a bit of explanation since the velocity curve 194 seems to have a "glitch" as it approaches zero. This glitch is indicative of a change in the vertical sensitivity of the oscilloscope at this point. To the left of the glitch, the vertical scale of the velocity curve 194 is approximately 32 inches/second per division, while to the right of the glitch the vertical scale has been changed to approximately 2 inches/second per division. This scale change was necessary to allow viewing of both the maximum velocity of approximately 50 inches per second, as well as being able to closely examine the velocity curve 194 as it approaches zero velocity.

While the seek from track zero to track 500 in FIG. 9A shows that the heads settled on-track quickly, as evidenced by the minimal "ringing" of the SPE signal 190 when the velocity 194 approaches zero and by the fact that the velocity curve descends smoothly to but does not cross zero velocity, FIG. 9B shows that significant overshoot occurs when seeking to track zero, as demonstrated by the fact that the velocity curve crosses zero velocity and actually moves in the reverse direction before coming to rest. This is indicative of the fact that the actuator has less deceleration capability in the outermost zone than it does in the zone containing track 500.

FIGS. 9C and 9D show the results when the same seeks were made using the same disc drive after the calibration procedure described above was implemented. A comparison of FIGS. 9B and 9D shows that the "ringing" of the SPE signal on the seek to track zero of FIG. 9D was significantly reduced, indicating additional deceleration capability after calibration was done. Similarly, the velocity curves of FIGS. 9C and 9D show a "plateau" shortly before dropping to zero velocity. This plateau aids in bringing the heads on-track without sympathetic vibrations being induced in the actuator mechanism. An examination of the SPE signals of the four figures shows that the SPE signals of FIGS. 9C and 9D are much more symmetrical than the SPE signals of FIGS. 9A and 9B as a result of the calibration.

Figure 10A:
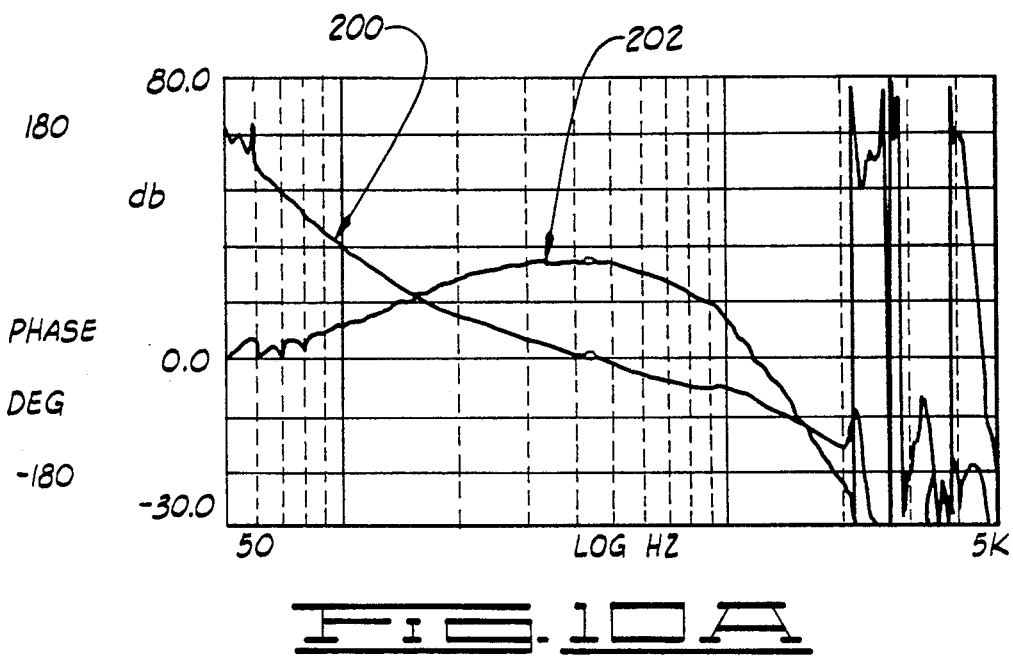
FIGS. 10A and 10B are graphs illustrating the improvement caused by the present invention in a disc drive with near nominal torque constant before implementation of the present invention.
Figure 10B:
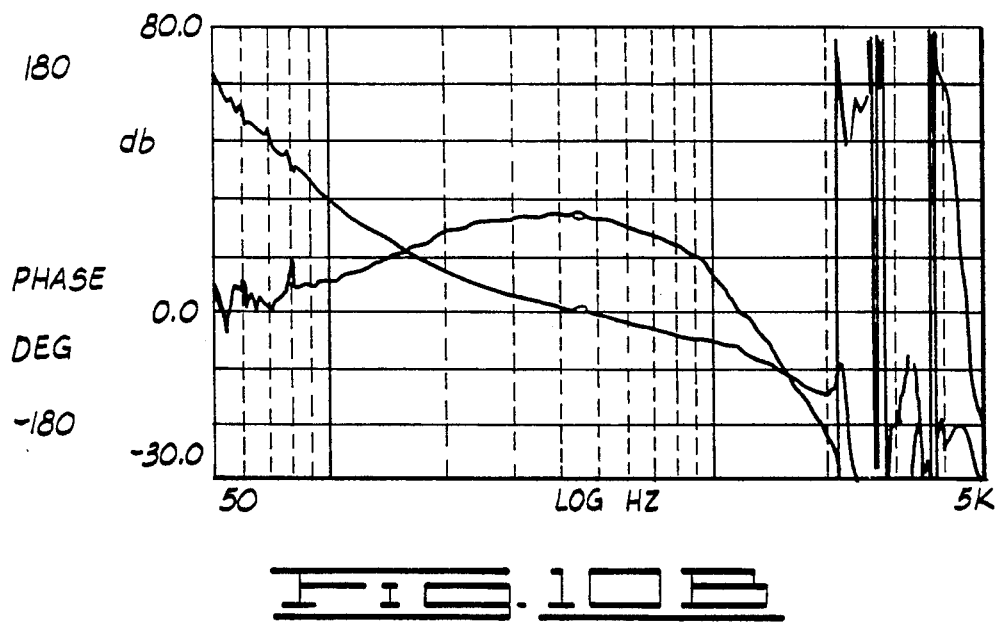

Another test was conducted to determine whether the torque calibration technique of the present invention would correctly compensate for drive to drive variations in torque capability. FIGS. 10A through 10D are graphic representations of these tests, with the horizontal scale being a log frequency scale. In each of these figures, two signals are plotted: a gain 200 of the servo loop, and a phase margin 202. The design goal was to optimize phase margin and the band width, which is proportional to the gain 200. In these tests the crossover frequency, the frequency where the gain 200 crosses 0 dB, was determined. For this test, a disc drive was selected which had close to nominal torque at track 500 before the calibration was performed. The crossover frequency of this drive was measured as being 438 Hz before calibration and 445 Hz after calibration. This small change due to the calibration is indicative of the fact that the disc drive had near-nominal torque capability before calibration. The results of these two tests are shown in FIGS. 10A and 10B, respectively.

Figure 10C:
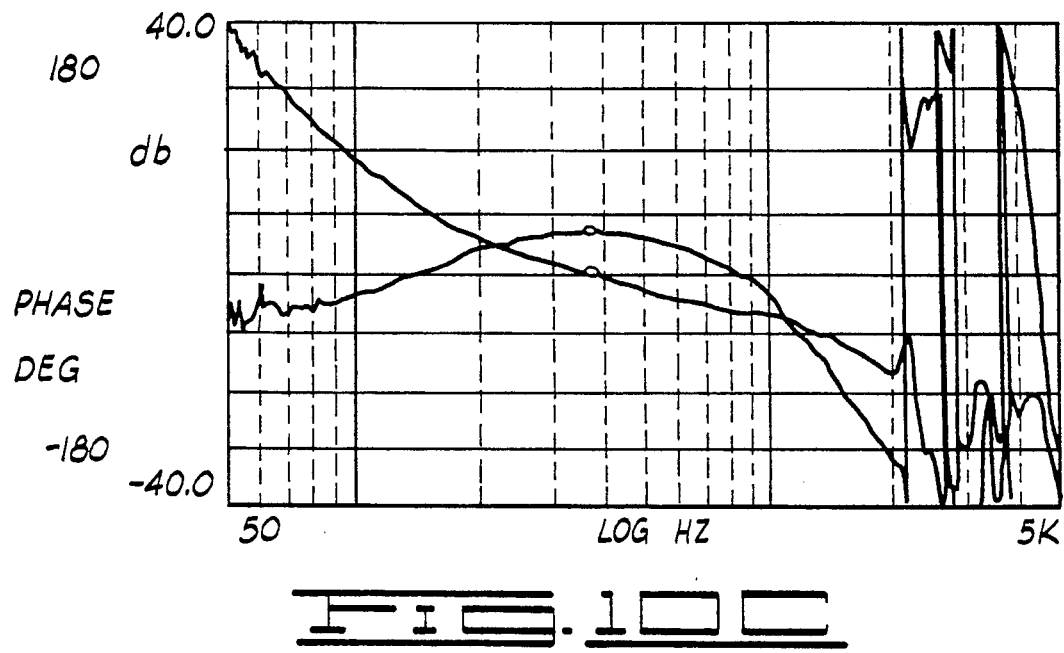
FIGS. 10C and 10D are graphs illustrating the improvement caused by the present invention in the disc drive of FIGS. 10A and 10B with a torque constant that is significantly different from nominal before implementation of the present invention.
Figure 10D:
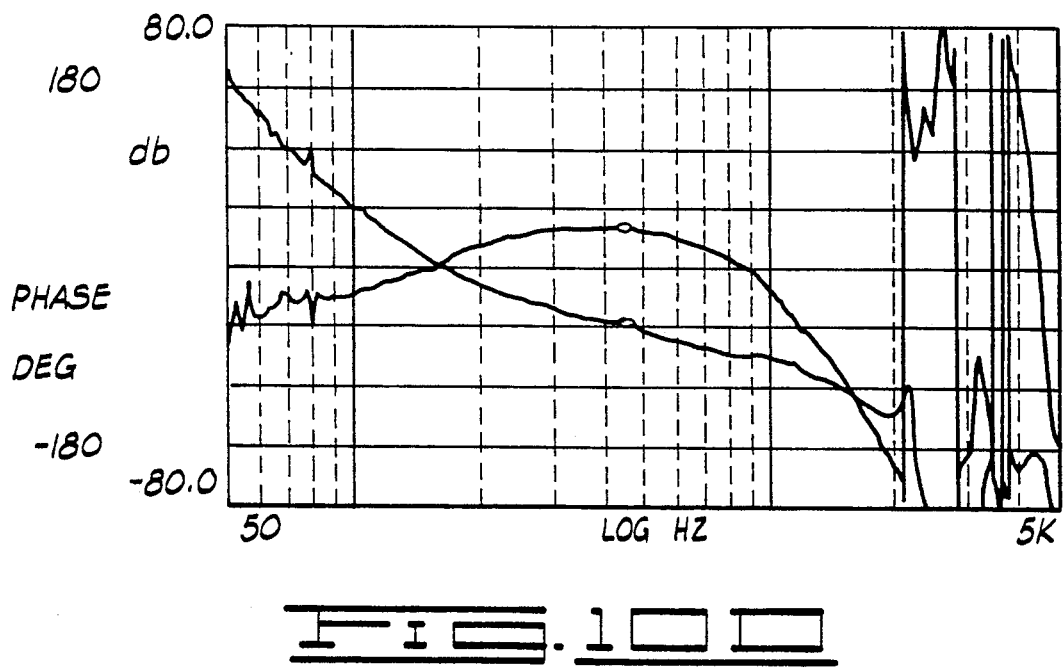

To simulate a disc drive having a torque capability at wide variance from nominal, the same disc drive was employed for the tests reflected in FIGS. 10C and 10D, however the gain of the power amplifier in the actuator drive circuit was intentionally lowered, reducing the torque capability of the disc drive. As shown in FIG. 10C, before calibration the disc drive exhibited a crossover frequency of only 373 Hz as shown in FIG. 10C. After the calibration routine was executed the test was re-run. As shown in FIG. 10D, the crossover frequency was moved back to 448 Hz by the calibration. This is very close to the 445 Hz crossover frequency obtained in FIG. 10B, and indicates that the greatest compensation will occur in those drives with torque constants farthest from nominal, thus greatly increasing the uniformity of the final product.

As previously mentioned, the calibration routine is initiated by the system microprocessor 134 (FIG. 6) as part of the power on routine when power is first applied to the disc drive. After the compensation factors have been stored in the RAM 98 (FIGS. 4 and 6) of the servo microprocessor 96, all track following and seek operations make use of the compensation factors to ensure uniform operation of the disc drive. When the track following mode is first entered, the compensation factor for the zone in which the selected track is located is read from the servo microprocessor RAM and becomes a factor in the calculation of the control signal sent by the servo microprocessor to the VCM control circuitry 100 (FIGS. 4 and 6) until a seek to another zone is initiated by the main microprocessor 134. Each time a seek is initiated, the "target zone", which is the zone in which the desired track resides, is determined and the compensation factor for the target zone is retrieved from the servo microprocessor RAM and used by the servo microprocessor to fine tune the servo loop gain.

As each seek is completed, the performance characteristics of the seek, such as seek time and settle time, are monitored, and if the seek did not meet expected performance parameters, the system microprocessor initiates a recalibration the first time that the disc drive is idle. That is, if no data transfers between the disc drive 120 and the host computer system 124 (FIG. 6) are taking place, the system microprocessor 134 sends a command to the servo microprocessor 96 on the internal command path 112 to re-initiate the calibration routine and store a new set of compensation factors in the RAM 98 of the servo microprocessor 96. Subsequent seeks and track following operations will utilize this new set of compensation factors to control the operation of the actuator motor.

It should be noted that the compensation factors stored in the torque compensation table in the servo microprocessor RAM are initially set to the value "1" during power up initialization. When the servo microprocessor calculates the value to be sent to the D/A convertor in the VCM control circuitry 100 (FIGS. 4 and 6), multiplying by this factor of 1 has no effect until the calibration routine has been executed, as will be described below.

Figure 11:
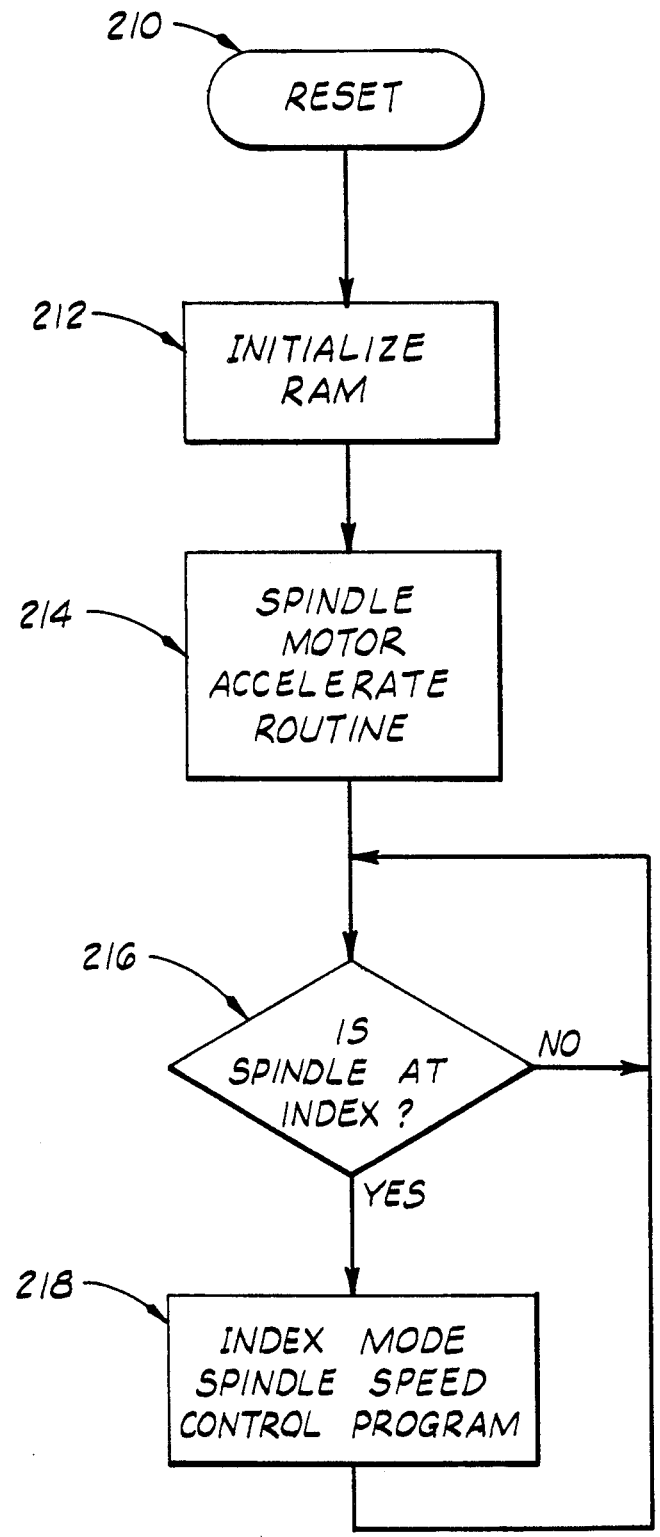
FIG. 11 is a flow chart of the main program executed by the servo microprocessor of FIG. 4.

The clearest way of showing the inter-relationship between the operation of the system microprocessor 134 (FIG. 6) and the servo microprocessor 96 is through the use of flow charts. FIG. 11 is a simplified flow chart of the main program executed by the servo microprocessor 96. The servo microprocessor 96 is reset at power on in step 210, initializing the hardware and setting it to a desired known condition. The servo microprocessor RAM 98 is initialized at step 212, and the servo microprocessor 96 then enters a routine to accelerate the spindle motor from rest to its specified operating speed in step 214. Once the spindle motor has reached its nominal operating speed, the servo microprocessor 96 enters a simple loop program checking for the index signal to be decoded by the servo data decode logic 94 in decision block 216, and when index has been detected, running an index mode spindle speed control program at step 218 to maintain the spindle motor at the desired speed. All other operations of the servo microprocessor are accomplished through the use of interrupts to the servo microprocessor 96.

Figure 12A:
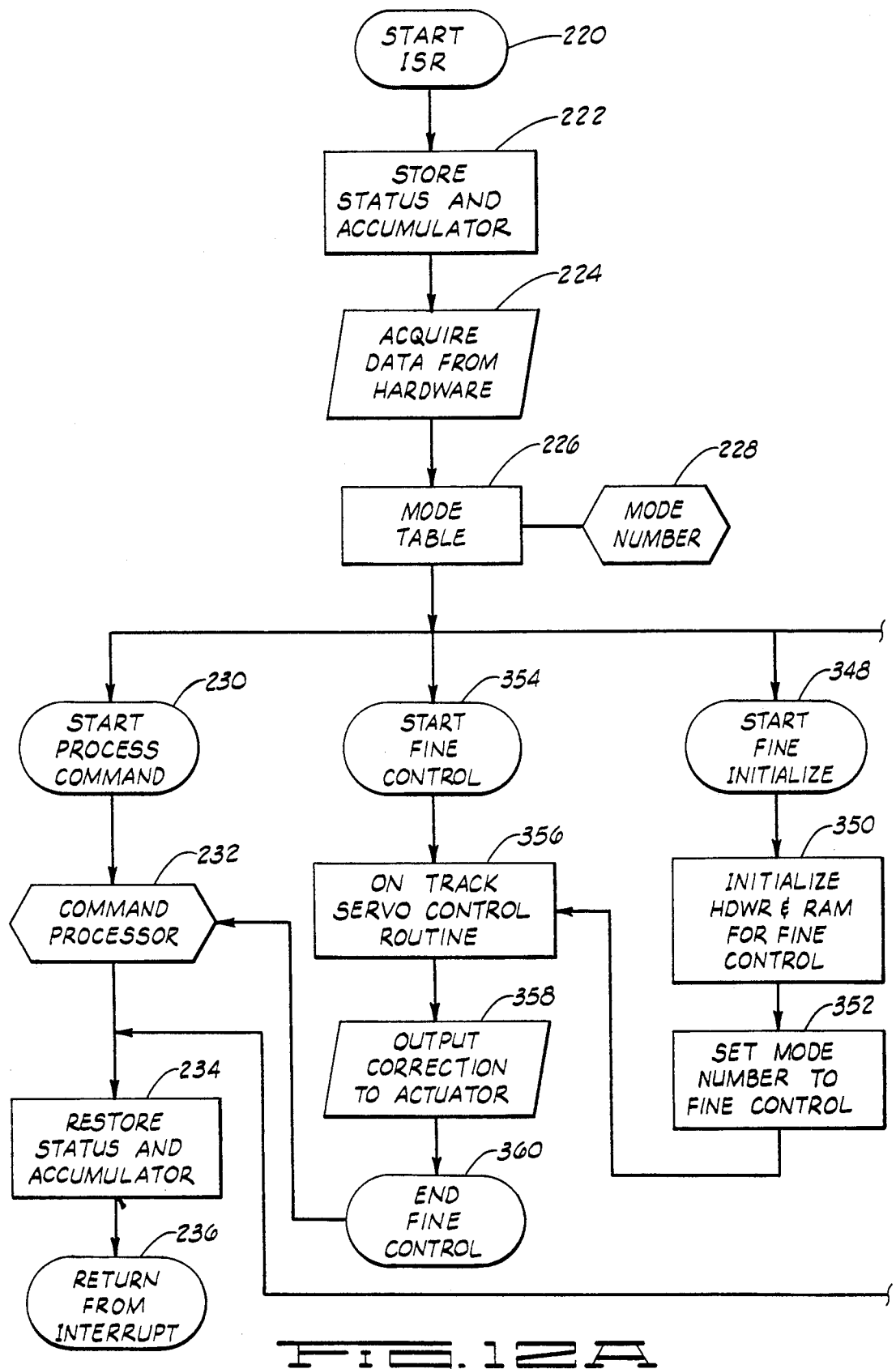
Figure 12C:
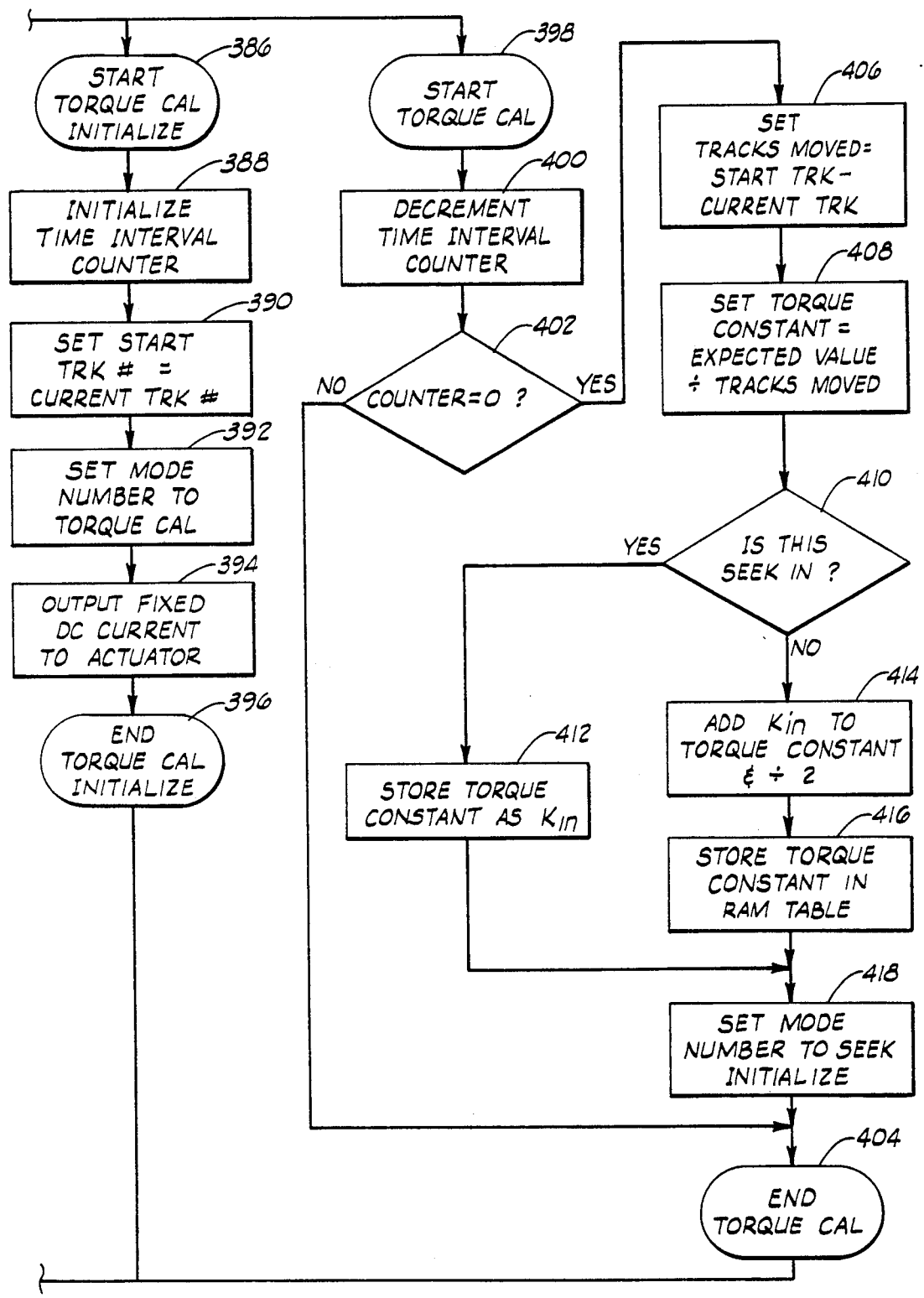

FIGS. 12A, 12B, and 12C show a portion of the main interrupt service routine (ISR) for the servo microprocessor 96. This is not intended to be a comprehensive flow chart for all functions performed by the servo microprocessor 96, but it does summarize the functions that the servo microprocessor 96 performs in the steps of the present invention. It should be recalled that interrupts are sent to the servo microprocessor 96 on a constant recurring basis, once the spindle motor has reached operating speed, as a function of the servo loop 90 (FIGS. 4 and 6). Specific generation of the interrupts and the timing used for this generation is explained in detail in the previously incorporated application. For purposes of this discussion, it is sufficient to know that an interrupt is sent to the servo microprocessor 96 once for each servo frame 102 (FIG. 5) at a time after the address, position and sector fields have been decoded by the servo data decode logic 94. This results in an interrupt every 42 microseconds.

Referring now to FIG. 12A, the interrupt service routine starts at a block numbered 220. The servo microprocessor 96 contains an accumulator which is the working register for mathematical and logical operations and a status register which defines several internal conditions for the program being executed. Since the servo microprocessor does not automatically store the accumulator and status register in response to an interrupt, the accumulator and status registers are saved as a first step 222 in the ISR. Next, several different types of information, such as the track address, actuator drive current, servo position error (SPE), presence of index, etc., are collected from the servo system and stored away in the servo microprocessor RAM at step 224. At this time, the specific interrupt to be serviced has not been identified and it is faster to simply store this information for every interrupt than to determine the reason for the interrupt and then collect the data necessary for servicing the interrupt. The ISR then selects the starting address of the proper service routine from a mode table at step 226, based on a mode number supplied by block 228. This mode number may be determined by the previously executed interrupt routine, or preset at power up. Assuming that this is the first interrupt after power application, the mode number points to the element of the mode table that supplies the starting address of the routine identified as "START PROCESS COMMAND" at block 230. This routine again involves a number of choices at block 232 the "COMMAND PROCESSOR", but before examining these choices, it should be noted that the flow diagram indicates that no matter what actions the COMMAND PROCESSOR initiates, the ISR returns to this point to finish servicing the interrupt, as do all other routines selected by the look up of the mode table at step 226. As FIG. 12A shows, the final steps in servicing all interrupts involves restoring the status register and accumulator at step 234 and exiting to the previously interrupted program at step 236.

Figure 13A:
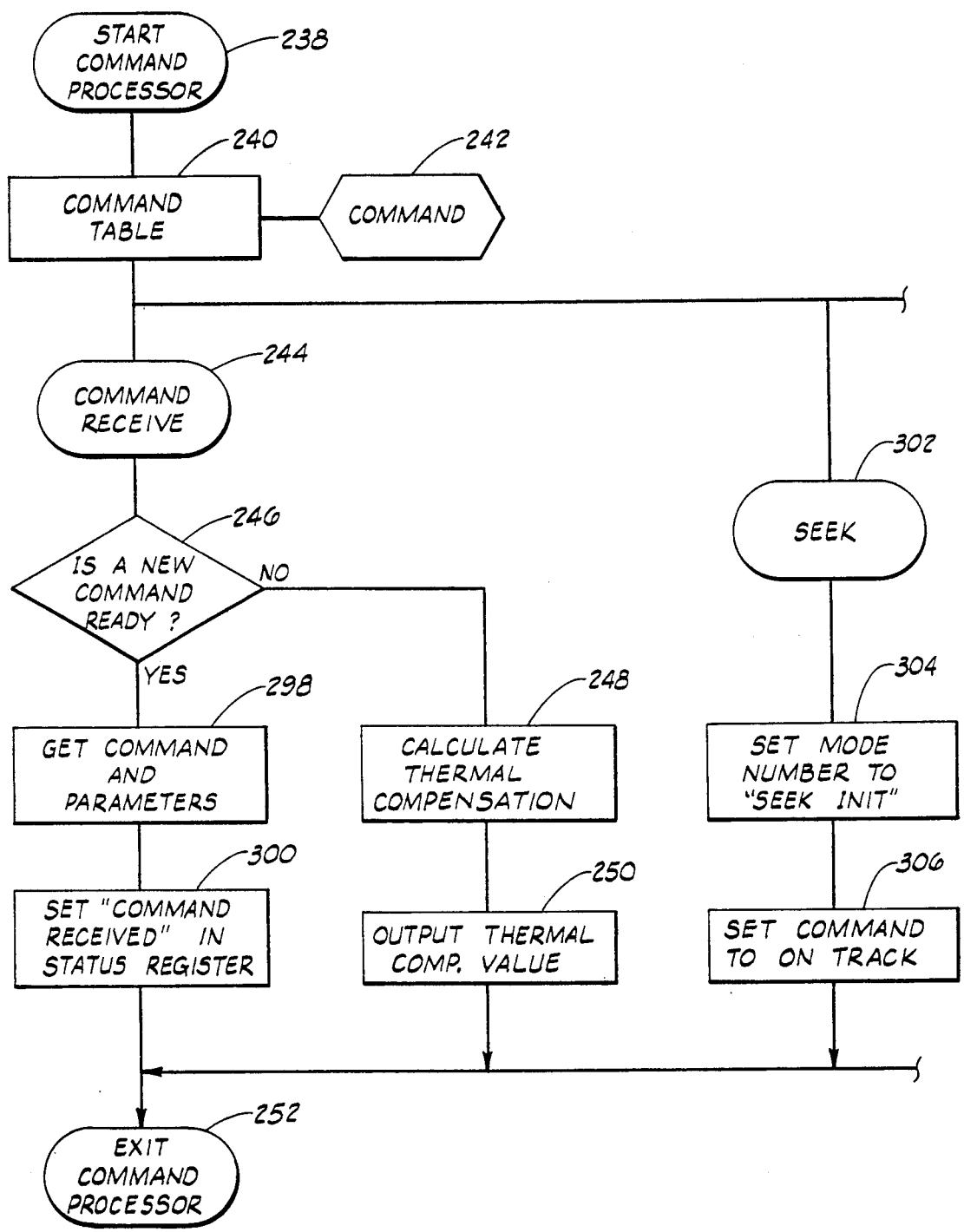
FIGS. 13A-13B are flow charts of a second level portion of the interrupt service routine executed by the servo microprocessor of FIG. 4.
Figure 13B:
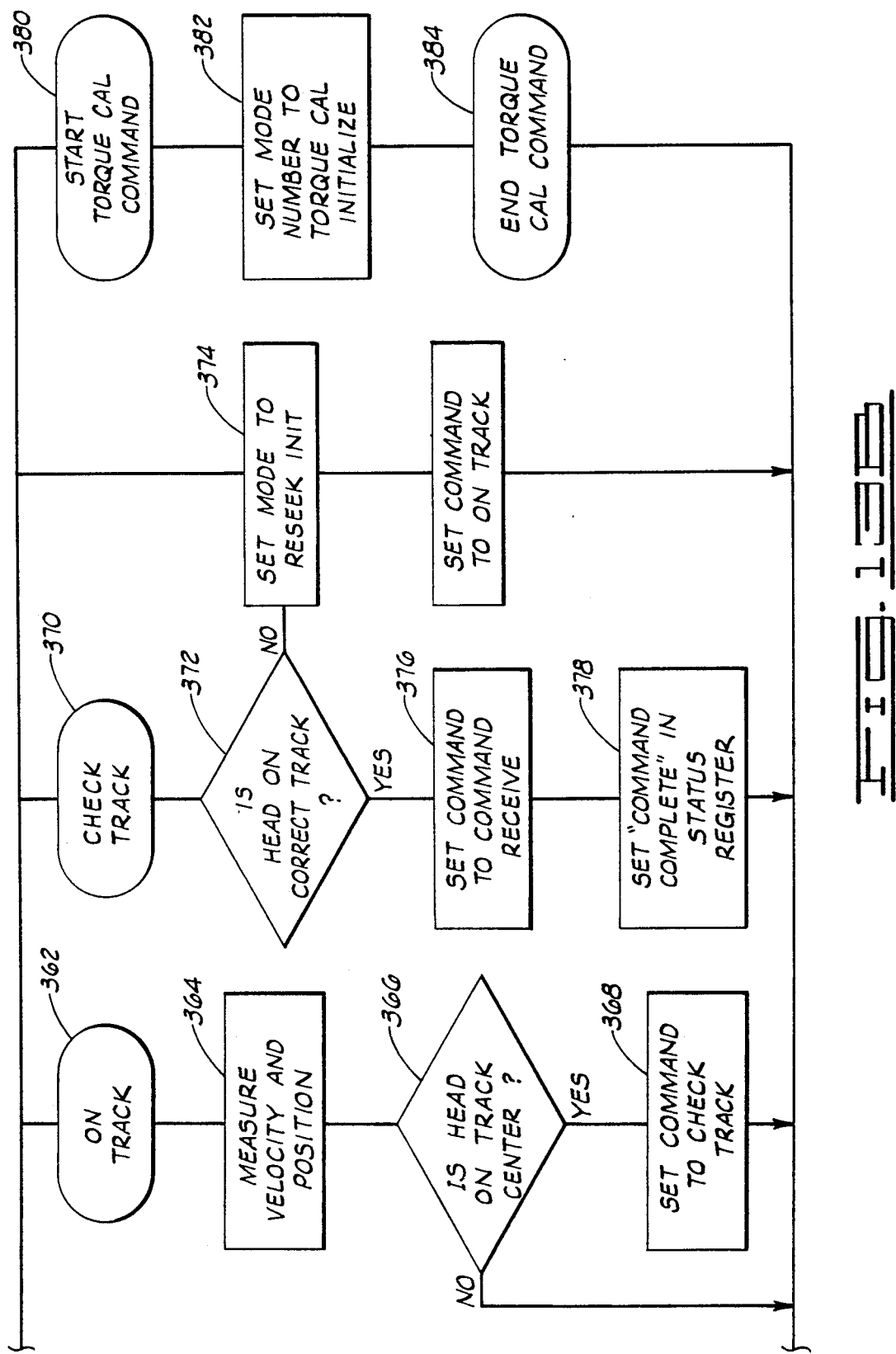

The operation of the COMMAND PROCESSOR is shown in the flow diagram of FIGS. 13A and 13B. FIGS. 13A and 13B are only a partial flowchart of all the options that can be executed by the COMMAND PROCESSOR, but includes the choices necessary to define the invention. The flow chart begins at step 238, and the subsequent path for the interrupt service is determined by selecting a starting address for the next program to be executed from a COMMAND TABLE at step 240. The specific address to be selected is determined by the COMMAND block 242. Once again, the COMMAND may be selected by a previously executed Command Process, or preset to a default value at power on. Once again assuming that this is the first interrupt after power on, the COMMAND block 242 selects the starting address of the COMMAND RECEIVE routine which begins at block 244 from the COMMAND TABLE 240. The COMMAND RECEIVE routine first checks to see if a command has been received from the system microprocessor 134 (FIG. 6) at step 246. If no command has been received, the servo microprocessor calculates a thermal compensation factor at step 248, transfers this compensation factor to the portion of the microprogram which controls actuator drive current at step 250 and exits the COMMAND PROCESSOR flow at step 252. It should be recalled that this exit returns program flow to step 234 of FIG. 12A, where the status register and accumulator are restored and the ISR is terminated at step 236. This path, steps 220 through 232, 238 through 252, and 234 to 236, interrupt servicing continues to be selected for each interrupt until a command is received by the servo microprocessor 96 from the system microprocessor 134.

Figure 14:
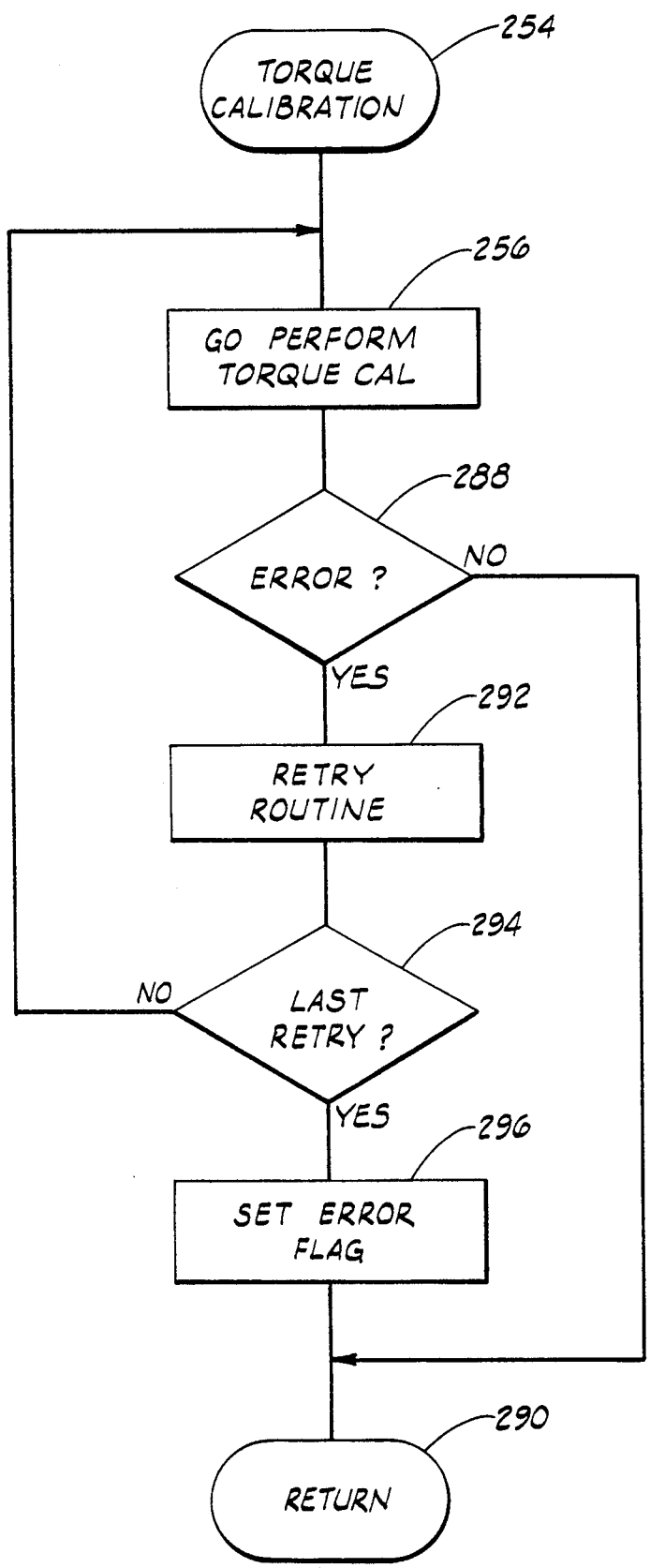
FIG. 14 is a flow chart of a portion of the power on routine used by the system microprocessor of FIG. 6 to implement the present invention.

Standard practice in the disc drive industry defines the outermost data track on the discs as "Track 0", and disc drives typically respond to the application of power by moving the heads to Track 0 as part of the power on routine of the system microprocessor to define a "starting point" from which all subsequent seeks are calculated. For purposes of this discussion, only those portions of the power on routine of the system microprocessor 134 that relate to the present invention will be reviewed. FIG. 14 is a flow chart of the portion of the power on routine which calls for calibration of the torque constant of the actuator as discussed above. In FIG. 14, the calibration routine is entered at step 254. In step 256, the command to initiate the calibration routine calls a second level routine, TORQUE CAL, which is detailed in FIG. 15.

Figure 15:
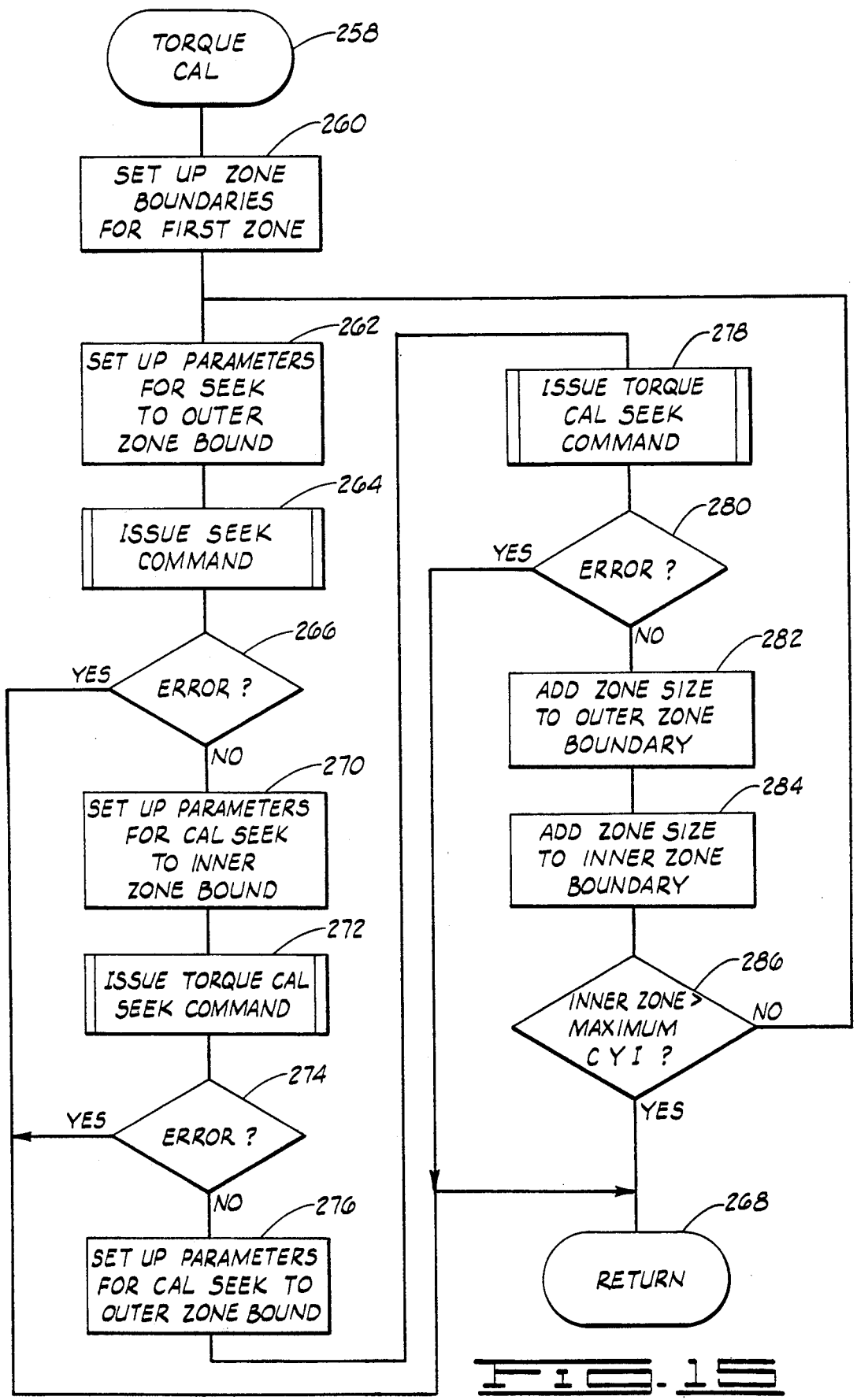
FIG. 15 is a flow chart of a second level routine called by the routine of FIG. 14 to implement the present invention.

FIG. 15 is an expansion of step 256 of FIG. 14 and shows the flow of the torque calibration routine, TORQUE CAL, executed by the system microprocessor 134. It should be recalled that this routine may be started as part of the power on routine, or as a result of performance monitoring as previously noted. The TORQUE CAL routine is started at step 258. The first action of the TORQUE CAL routine, at step 260, is to set up the inner and outer boundaries of the first zone to be tested. For purposes of this discussion, it will be assumed that the zones will be tested from the outermost zone (Zone A in FIG. 7) to the innermost zone (Zone J in FIG. 7), and that step 260 thus defines the outer boundary of the first zone to be tested as Track 0, and the inner boundary as Track 255. Next, at step 262, the defined zone boundaries are used to set up the command parameters for a normal seek to the outer boundary of the zone to be tested, and the seek command is passed to the servo microprocessor at step 264.

The functions performed by the servo microprocessor in response to the command issued in step 264 will be discussed below. For now the operation of the system microprocessor will continue to be followed. At the decision block 266, a check is made to test that the servo microprocessor has correctly executed the seek to the outer boundary of the test zone. If an error has occurred, the program branches directly to the exit of the routine at block 268. The result of this error will be discussed below. Correct operation of the seek to the outer zone boundary causes the program to continue at step 270, where the target parameters for the first of the unique calibration seeks from the outer zone boundary toward the inner zone boundary are defined. Then the TORQUE CAL SEEK COMMAND, including the inner zone boundary as a target track, is passed to the servo microprocessor at step 272. Acknowledgment of the correct execution of the TORQUE CAL SEEK COMMAND is then checked at decision block 274, and assuming correct operation, the program progresses to step 276.

Step 276 is used to set up the target parameters for a calibration seek to the outer zone boundary, and the second TORQUE CAL SEEK COMMAND is passed to the servo microprocessor at step 278. The decision block at 280 again checks for an acknowledgment from the servo microprocessor, and again assuming correct operation, the program progresses to step 282. In step 282, the outer zone boundary originally established in step 260 is incremented by 256 tracks to establish the outer boundary of the next zone to be tested, as is the inner boundary in step 284. Once the new zone boundaries have been determined in steps 282 and 284, a check is made in decision block 286 to determine if the inner zone boundary established at step 284 exceeds the maximum cylinder on the disc drive, which would indicate that the final zone has been tested. If it has not, the loop of steps 262 through 266, and 270 through 286 is repeated for each zone until the innermost zone (Zone J in FIG. 7) has been tested, at which time the routine is exited at step 268. It should be noted that a failure of any of the interprocessor commands of steps 264, 272 and 278 would be detected in decision blocks 266, 274 and 280 and immediately terminate the routine at step 268. When the routine is ended, program control returns to the flow chart of FIG. 14.

Returning to FIG. 14, when the TORQUE CAL routine detailed above ends at step 256, a check is made at decision block 288 to determine if the routine of FIG. 15 executed without any errors being detected at steps 266, 274 or 280. If no errors were detected, the routine ends at step 290. If an error was detected, a retry routine at step 292 is performed. The retry routine of step 292 includes an iteration counter which counts the number of retries. This iteration count is checked at step 294, and if the maximum number of retries has not been attempted, program control passes back to step 256, which reinitiates the TORQUE CAL routine of FIG. 15. If the check of the number of retries at step 294 indicates that a preselected maximum number of retries has been attempted, an error flag is set at step 296 and the routine is exited at step 290. The error flag set in step 296 notifies the system microprocessor that the torque calibration could not be accomplished.

Returning now to the operation of the servo microprocessor, it should be recalled that power on initialization put the servo microprocessor into a loop (steps 216 and 218 of FIG. 11) waiting for index and controlling spindle motor speed, while servicing interrupts every 42 microseconds with the interrupt service routine (ISR) of FIGS. 12A, 12B and 12C and that the ISR is initially set up to follow the COMMAND PROCESSOR path (steps 230 and 232 of FIG. 12A), which is detailed in FIGS. 13A and 13B. In FIG. 13A, power on initialization selects the COMMAND RECEIVE path starting at step 244 from the COMMAND TABLE 240. Step 246 checks to see if a command has been received from the system microprocessor. When the system processor sends the first seek to the outer boundary of the zone to be tested (step 264 of FIG. 15), the seek command and target track are read by the servo microprocessor at step 298, and a "command received" bit is set in the status register of the servo microprocessor at step 300 to notify the system microprocessor of the receipt of the command. At the next interrupt, the COMMAND PROCESSOR is again called, but the decoding of the SEEK command at 242 selects the starting address of the SEEK command routine from the COMMAND TABLE 240, which passes program control to the SEEK routine at step 302. At step 304, MODE selection for "SEEK INIT" is sent to the mode number selection (step 228 in FIG. 12A) to set up for the next interrupt. Step 306 sets up the command selection 242 to select "ON TRACK" as the next path through the COMMAND PROCESSOR.

On the next interrupt, the ISR of FIGS. 12A, 12B and 12C is entered at step 220, the accumulator and status registers are stored at step 222 and the current hardware parameters are collected at step 224. On this pass through the ISR, however, the mode number selection of block 228 has been set up to select the starting address of the "SEEK INIT" routine from the MODE TABLE in block 226, which begins the SEEK INITIALIZE routine at step 308 of FIG. 12B. In step 310, the destination address passed to the servo microprocessor with the seek command is read into the working logic of the servo microprocessor. Steps 312 and 314 initialize the internal hardware, RAM and Mode selection to begin the desired type of seek at the next interrupt. Determination of the desired seek type is based on the difference between the current head location, obtained in step 224 of FIG. 12A, and the destination track read in step 310 If the difference is greater than four tracks, a high velocity seek is selected. Otherwise, a low velocity seek is selected. The SEEK INITIALIZE routine is then ended at step 316 and the servo microprocessor returns to the loop program of steps 216 and 218 of FIG. 11, awaiting the next interrupt.

Assuming that the heads were more than four tracks from the destination track, the next pass through the ISR selects the starting address of the HI VEL SEEK routine from the MODE TABLE 226 of FIG. 12A, and the HI VEL SEEK routine begins at step 318 of FIG. 12B. The HI VELOCITY SEEK SERVO CONTROL routine is shown as a single block 320. Details of this routine can be found in the previously incorporated co-pending application, but, for this discussion, it is sufficient to note that the actuator is accelerated toward the destination track in accordance with a stored acceleration and deceleration profile. Acceleration continues until a maximum velocity is attained or until the heads approach the destination closely enough to begin decelerating. The calculated servo correction value is sent to the actuator coil in step 322. Decision block 324 examines the servo seek parameters looking for a specific deceleration threshold velocity. As long as the HI VELOCITY SEEK SERVO CONTROL routine is accelerating the actuator, and until deceleration is begun and the velocity reaches the deceleration threshold velocity, decision block 324 simply ends the HI VEL SEEK service routine at step 326. Subsequent interrupts will continue to select the HI VEL SEEK routine starting at step 318 until the heads approach the destination track and the threshold deceleration velocity is reached, at which time the decision block 324 passes program control to step 328, where the mode selection is set up to select the LO VEL SEEK INIT mode on the next pass through the ISR.

LO VEL SEEK INIT is started at step 330 of FIG. 12B. At step 332, internal hardware and RAM are initialized for the low velocity seek mode (LO VEL SEEK), and step 334 sets up mode selection to select the LO VEL SEEK routine on the next interrupt. The LOW VELOCITY SEEK SERVO CONTROL routine is then entered at step 336, continuing the deceleration of the heads to rest on the destination track. The correction value for the actuator coil is then sent to the actuator in step 338, and a check is made in decision block 340 to see if the heads are on the destination track. If not, the LOW VEL SEEK routine is ended at step 342, and subsequent interrupts will select the LO VEL SEEK routine starting at step 344, continuing through steps 336 through 342, until the heads arrive on the destination track. At that time, decision block 340 passes program control to step 346, where mode selection is set up to select FINE INITIALIZE mode during servicing of the next interrupt.

The FINE INITIALIZE mode, consisting of steps 348, 350 and 352 of FIG. 12A, sets up the hardware, RAM and mode selection to select the FINE CONTROL mode during subsequent interrupt services. The FINE CONTROL mode is also referred to as the Track Following mode, and is used to maintain the heads centered on the desired track. The FINE CONTROL mode, consisting of steps 354, 356 and 358, executes the ON TRACK SERVO CONTROL routine, outputs necessary correction values to the VCM control circuitry 100, and ends at step 360 by calling the COM- MAND PROCESSOR. As long as the disc drive is sitting on-track in track following mode, all interrupt services run through the FINE CONTROL routine and call the COMMAND PROCESSOR.

Turning once again to FIGS. 13A and 13B, it should be recalled that on the last pass through the COMMAND PROCESSOR before the seek was begun, the command selection was set up to select the ON TRACK routine at step 306 of the SEEK routine. On the first pass through the COMMAND PROCESSOR after the FINE INITIALIZE routine on FIG. 12A, the COMMAND PROCESSOR thus selects the ON TRACK routine starting at step 362 of FIG. 13B. At step 364 the velocity and position of the actuator are checked and, at decision block 366, the results of the measurements of step 364 are checked to determine if the heads are centered on the destination track. Until the heads do arrive at track center, this loop, steps 354 through 366, is repeated for each interrupt service. Once the heads are centered on the track, decision block 366 passes program control to step 368, where the command number selection 242 of FIG. 13A is set up to select the CHECK TRACK routine on the subsequent pass through the COMMAND PROCESSOR. The CHECK TRACK routine, starting at step 370 of FIG. 13B, checks at step 372 to see if the heads are centered on the correct track. If not, a "RESEEK INIT" is initiated at step 374. Since the "RESEEK INIT" is not germane to the concept of the present invention, it will not be discussed here. Instead, it will be assumed that the seek did result in the heads being centered on the destination track, and that program flow continues with step 376, where the command selection is set up to the COMMAND RECEIVE routine for the next pass through the COMMAND PROCESSOR to await the next command from the system microprocessor. At step 378, the COMMAND COMPLETE bit is set in the status register, to let the system microprocessor know that the requested seek has been successfully completed. Subsequent interrupts cause the servo microprocessor to follow the flow path through the FINE CONTROL routine (steps 354 through 360 on FIG. 12A) and the COMMAND RECEIVE routine through the COMMAND PROCESSOR flows (steps 244 through 252 on FIG. 13A) until another command is received from the system microprocessor at step 246.

Referring back to FIG. 15, the next command sent by the system microprocessor to the servo microprocessor is the TRQ CAL SEEK COMMAND sent in step 272 to initiate the calibration seek from the outer zone boundary toward the inner zone boundary. Turning now to the COMMAND PROCESSOR flow of FIGS. 13A and 13B, when the TRQ CAL SEEK command is received in step 246 of FIG. 13A, the command and parameters are read at step 298, and an acknowledgment of the command is sent back to the system microprocessor by setting the COMMAND RECEIVED bit in the status register at step 300. Reading the command in step 298 sets up the command selection 242 to select the TORQUE CAL COMMAND routine on the next interrupt On the next pass through the COMMAND PROCESSOR, the address selected from the COMMAND TABLE 240 of FIG. 13A starts the TORQUE CAL COMMAND routine at step 380 of FIG. 13B, which sets up the mode selection to select the TORQUE CAL INITIALIZE routine at the next interrupt in step 382, and ends the routine at step 384.

The next time the interrupt service routine in FIGS. 12A, 12B and 12C is entered, the mode selection set up in step 382 of FIG. 13B above causes the TORQUE CAL INITIALIZE routine to be started at step 386 of FIG. 12C. At step 388, a "Time Interval Counter" is initialized. This Time Interval Counter is used to count the number of interrupts that will occur in the fixed time interval (time t in FIG. 8) that makes up the first portion of the calibration seek, as previously described in relation to FIGS. 7 and 8 above. Step 390 sets a "Start Track" equal to the current track from which the calibration seek will begin. This figure will later be used to calculate how far the heads move in the fixed time interval. Step 392 then sets up the MODE NUMBER selection 228 of FIG. 12A to select the TORQUE CAL routine at the next interrupt. The servo microprocessor then outputs the calibration fixed value to drive the actuator motor at step 394 and the routine ends at step 396.

At the next interrupt, the MODE NUMBER selection 228 of FIG. 12A causes the starting address of the TORQUE CAL routine to be chosen from the MODE TABLE 226, and the TORQUE CAL routine begins at step 398 of FIG. 12C. In step 400, the Time Interval Counter that was initialized in step 388 is decremented, and the counter is checked for zero in step 402. If the Time Interval Counter has not been decremented to zero, indicating that not enough interrupts have occurred since its initialization to equal the desired fixed time interval, the TORQUE CAL routine is ended at step 404. All subsequent interrupts follow the same path through the ISR until the decrementing of the Time Interval Counter at step 400 results in a zero difference. At this point, program control passes to step 406 where a value called "Tracks Moved" is calculated by subtracting the current track number from the Start Track number set up in step 390. The absolute value of this difference is the number of "Tracks Moved" during the fixed time interval set up by counting the number of interrupts with the Time Interval Counter in steps 400 and 402.

A torque constant is calculated in step 408 by dividing the expected number of tracks by the actual number of "TRACKS MOVED", as determined in step 406. In the example being cited, this expected number of tracks would be 128 or half the number of tracks in the zone being tested. Next, a decision is made at step 410 as to whether this is a SEEK IN (the first calibration seek in the zone) or a seek out (the second calibration seek in the zone) based on the command parameters received with the command from the system microprocessor. If this is a seek toward the inner boundary of the zone, the torque constant calculated in step 408 is stored in a temporary working location as "Kin" in step 412. Otherwise, this is a seek toward the outer boundary of the zone being tested (the second calibration seek in the zone), and the torque constant calculated in step 408 is added to the "Kin" value, the sum is divided by 2 to obtain a bi-directional average torque constant value in step 414, and this average result stored as a zone compensation value in the Torque Compensation Table at step 416 in the servo microprocessor RAM at the location reserved for the tested zone, replacing the "1" previously stored in the table at power up initialization. Whichever calibration seek is being performed, inward or outward, the flows rejoin at step 418 where the mode number selection is set up to select the "SEEK INITIALIZE" routine and perform a normal seek, as previously described, to complete the calibration seek to the zone boundary opposite the "Start Track" selected in step 390 of FIG. 12C. The TORQUE CAL routine is then ended at step 404. All subsequent seeks to the tested zone then make use of the "Torque Constant" stored in the table in step 416 to optimize the seek to and track following in the zone.

The system microprocessor torque calibration routine of FIG. 15 loops from steps 262 to 286 and back until all zones have been similarly tested, and the appropriate "Torque Constant" is stored in the Torque Compensation Table for each zone.

Although the example cited discloses a particular number of radial zones, with a given number of tracks per zone, and the technique described calibrates the zones from the outside of the disc to the inside, and performs the calibration seeks in each zone first from the outer zone boundary to the inner zone boundary, and secondly from the inner zone boundary to the outer zone boundary, these are all design choices which do not bear directly on the spirit of the invention. Other numbers of zones, numbers of tracks per zone, orders of calibration, and methods of calibration within each zone can all be chosen without circumventing the scope of the invention. It will be clear that calibration of the torque capability of the disc drive actuator within a selected number of radial zones allows calculated compensation factors for each of these zones to be used to ensure uniform performance of disc drives incorporating the present invention regardless of normal tolerance variations in magnetic and electronic components, and, allows the use of less expensive components to lower the cost of the final product and to provide longer optimal performance of each individual unit.

It will be clear that the present invention is well adapted to carry out the objects and attain the ends and advantages mentioned as well as those inherent therein. While presently preferred embodiments have been described for purposes of this disclosure, numerous changes may be made which will readily suggest themselves to those skilled in the art and which are encompassed in the spirit of the invention disclosed and defined in the appended claims.

What is claimed is:

1. A method for compensating for variations in an actual torque constant $K_T$ from a nominal torque constant, $K_{nom}$, in an actuator for moving read/write heads across the surface of discs in a disc drive, comprising the steps of:

(a) dividing the disc surface into a number of zones, each of said zones containing a known number of tracks;

(b) energizing the actuator so that the read/write heads are disposed substantially stationary at the outer track of one of the zones;

(c) applying a fixed DC voltage, $V_{DC}$, of a first polarity to the actuator to move the heads toward the inner track of the zone for a time interval, T, sufficient to allow movement of the heads across a known number of tracks, $t_k$, if the actual torque constant, $K_T$, is equal to $K_{nom}$;

(d) reading the number of the track over which the heads are positioned at the end of the time interval T and placing the actuator into normal seek mode to move the heads to the innermost track of the zone;

(e) subtracting the track number of the outermost track in the zone from the number read in step (d) to obtain a number of tracks crossed moving inward, $t_{in}$, during the time interval T;

(f) applying the fixed DC voltage in a second polarity opposite the first polarity, $-V_{DC}$, to the actuator to move the heads toward the outer track of the zone for the time interval T;

(g) reading the number of the track over which the heads are positioned at the end of the time interval T, and placing the actuator into normal seek mode to move the heads to the outer track of the zone;

(h) subtracting the number read in step (g) from the track number of the inner track of the zone to obtain a number of tracks crossed moving outward, $t_{out}$, during the time interval T;

(i) adding $t_{in}$ and $t_{out}$ and dividing this sum by two to obtain an average number of tracks, $t_{avg}$, crossed during the time interval T;

(j) comparing $t_{avg}$ to the known number of tracks $t_k$ to derive a compensation torque factor $K_{tx}$ for the zone;

(k) saving the zone compensation torque factor $K_{tx}$ in a look-up table;

(l) repeating steps (b) through (k) for each zone; and (m) applying the zone compensation torque factors from the look-up table during subsequent seek and track following operations.

2. A method for compensating for variations in acceleration and deceleration capability of a voice coil actuator motor in a disc drive in which discs are rotated for data transfer at track locations thereon responsive to positioning of read/write heads supported by the voice coil actuator, the method comprising the steps of:

dividing the discs radially into a plurality of zones, each zone having an outer boundary and an inner boundary;

for each zone, the steps of: moving the heads to the outer zone boundary;

applying a DC voltage to the voice coil actuator motor for a selected time interval, wherein the polarity of the applied voltage is selected to accelerate the heads toward the inner zone boundary and the time interval is selected to move the heads a selected distance toward the inner zone boundary;

determining the actual distance moved by the heads at the end of the acceleration of the heads toward the inner zone boundary;

dividing the distance selected for movement toward the inner zone boundary by said actual distance moved by the heads toward the inner zone boundary to derive a compensation factor, Kin, which is inversely proportional to the acceleration and deceleration capability of the voice coil motor during movement of the heads toward the inner zone boundary;

moving the heads to the inner zone boundary;

applying a DC voltage to the voice coil actuator motor for a selected time interval, wherein the polarity of the applied voltage is selected to accelerate the heads toward the outer zone boundary and the time interval is selected to move the heads a selected distance toward the outer zone boundary;

determining the actual distance moved by the heads at the end of the acceleration of the heads toward the outer zone boundary;

dividing the distance selected for movement toward the outer zone boundary by said actual distance moved by the heads toward the outer zone boundary to derive a compensation factor, Kout, which is inversely proportional to the acceleration and deceleration capability of the voice coil motor during movement of the heads toward the outer zone boundary; and determining an average zone compensation factor, Kavg, for the zone by averaging Kin and Kout;

saving the average zone compensation factors; and applying the average zone compensation factors to all subsequent movements of the voice coil actuator in track following operations.

* * * * *

UNITED STATES PATENT AND TRADEMARK OFFICE
CERTIFICATE OF CORRECTION

PATENT NO. : 5,305,160
DATED : April 19, 1994
INVENTOR(S) : Otis L. Funches, Randall D. Hampshire & Vladimir Kovner It is certified that error appears in the above-indentified patent and that said Letters Patent is hereby corrected as shown below:

Column 6, line 51, delete "+5%" and substitute therefor --±5%--;

Column 6, line 63, delete "+3%" and substitute therefor --±3%--;

Column 11, line 20, delete "Kin" and substitute therefor --$K_{in}$--;

Column 18, line 3, after "310" insert a period --.--; and

Column 22, line 36, after "steps of:", start a new line and indent 5 spaces.

Signed and Sealed this

Twenty-eight Day of March, 1995

*Attest:*

BRUCE LEHMAN

*Attesting Officer*     *Commissioner of Patents and Trademarks*